(12) United States Patent
Wu et al.

(10) Patent No.: US 10,373,075 B2
(45) Date of Patent: Aug. 6, 2019

(54) SMART SUGGESTIONS FOR QUERY REFINEMENTS

(71) Applicant: Microsoft Technology Licensing, LLC, Redmond, WA (US)

(72) Inventors: Xianren Wu, Santa Clara, CA (US); Satya Pradeep Kanduri, Mountain View, CA (US); Vijay Dialani, Fremont, CA (US); Ye Xu, Hanover, NH (US); Yan Yan, San Jose, CA (US); Viet Thuc Ha, Milpitas, CA (US); Abhishek Gupta, San Francisco, CA (US); Shakti Dhirendraji Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 15/188,590

(22) Filed: Jun. 21, 2016

(65) Prior Publication Data

US 2017/0364596 A1     Dec. 21, 2017

(51) Int. Cl.
| G06F 17/00 | (2019.01) |
| G06N 20/00 | (2019.01) |
| G06F 16/2453 | (2019.01) |
| G06Q 50/00 | (2012.01) |
| H04L 29/08 | (2006.01) |

(52) U.S. Cl.
CPC ......... *G06N 20/00* (2019.01); *G06F 16/2453* (2019.01); *G06Q 50/01* (2013.01); *H04L 67/02* (2013.01); *H04L 67/18* (2013.01)

(58) Field of Classification Search
CPC ........... G06F 17/30864; G06F 17/3064; G06F 17/30867; G06F 17/30389; G06F 17/3097
See application file for complete search history.

(56) References Cited

U.S. PATENT DOCUMENTS

| 6,501,855 B1 | 12/2002 | Zelinski |
| 8,935,263 B1 | 1/2015 | Rodriguez et al. |
| 9,135,573 B1 | 9/2015 | Rodriguez et al. |

(Continued)

OTHER PUBLICATIONS

"U.S. Appl. No. 15/168,811, Non Final Office Action dated Apr. 19, 2018", 28 pgs.

(Continued)

*Primary Examiner* — Truong V Vo
(74) *Attorney, Agent, or Firm* — Schwegman Lundberg & Woessner, P.A.

(57) ABSTRACT

In an example embodiment, a query for search results is received, the query including at least one value for one facet, a facet defining a categorical dimension for the search results. It is then determined that the facet in the query is exclusive. In response to the determination that the facet is exclusive: for each potential facet different from the facet in the query: for each potential value in the potential facet: conditional entropy gain of the value in the query and the potential value is determined. The potential value in the potential facet that has the highest conditional entropy gain is determined, as is the potential facet with the minimum maximum conditional entropy gain. Then the potential facet with the minimum maximum is input into a machine learning model, causing the machine learning model to output one or more suggested facets to add to the query.

20 Claims, 17 Drawing Sheets

(56) References Cited

U.S. PATENT DOCUMENTS

| | | | |
|---|---|---|---|
| 9,286,569 | B2 | 3/2016 | Koran et al. |
| 2008/0027747 | A1 | 1/2008 | Mcgovern et al. |
| 2008/0262902 | A1 | 10/2008 | Bullis et al. |
| 2011/0264656 | A1* | 10/2011 | Dumais ............... G06F 17/3087 707/728 |
| 2012/0023031 | A1 | 1/2012 | Galya |
| 2012/0078902 | A1 | 3/2012 | Duboue et al. |
| 2012/0226681 | A1* | 9/2012 | Paparizos ........... G06F 17/3053 707/723 |
| 2015/0331948 | A1 | 11/2015 | Arning et al. |
| 2017/0344554 | A1 | 11/2017 | Ha et al. |
| 2017/0344555 | A1 | 11/2017 | Yan et al. |
| 2017/0344556 | A1 | 11/2017 | Wu et al. |
| 2017/0344954 | A1 | 11/2017 | Xu et al. |

OTHER PUBLICATIONS

"Applicant Initiated Interview Summary Issued in U.S. Appl. No. 15/168,811", dated Jul. 30, 2018, 4 Pages.

"Final Office Action Issued in U.S. Appl. No. 15/168,811", dated Jan. 2, 2019, 43 Pages.

"Response to Non Final Office Action Issued in U.S. Appl. No. 15/168,811", filed Aug. 20, 2018, 13 Pages.

"Applicant Initiated Interview Summary Issued in U.S. Appl. No. 15/168,903", dated Dec. 13, 2018, 3 Pages.

"Non Final Office Action Issued in U.S. Appl. No. 15/168,903", dated Oct. 26, 2018, 26 Pages.

"Response to Non Final Office Action Issued in U.S. Appl. No. 15/168,903", dated Jan. 3, 2019, 12 Pages.

"Applicant Initiated Interview Summary in U.S. Appl. No. 15/169,413", dated Nov. 14, 2018, 3 Pages.

"Non-Final Office Action Issued in U.S. Appl. No. 15/169,413", dated Oct. 3, 2018, 34 Pages.

"Response to Non Final Office Action filed in U.S. Appl. No. 15/169,413", filed Nov. 8, 2018, 20 Pages.

\* cited by examiner

SMART SUGGESTIONS FOR QUERY REFINEMENTS

TECHNICAL FIELD

The present disclosure generally relates to computer technology for solving technical challenges in search queries to data sources. More specifically, the present disclosure relates to smart suggestions for query refinements.

BACKGROUND

The rise of the Internet has occasioned two disparate phenomena: the increase in the presence of social networks, with their corresponding member profiles visible to large numbers of people, and the increase in use of social networks for job searches, both by applicants and by employers. Employers, or at least recruiters attempting to connect applicants and employers, often perform searches on social networks to identify candidates who have qualifications that make them good candidates for whatever job opening they are attempting to fill. The employers or recruiters can then contact these candidates to see if they are interested in applying for the job opening.

Traditional querying of social networks for candidates involves the employer or recruiter entering one or more search terms to manually create the query. A key challenge in talent search is to translate the criteria of a hiring position into a search query that leads to desired candidates. To fulfill this goal, the searcher has to understand which skills are typically required for the position, what are the alternatives, which companies are likely to have such candidates, which schools the candidates are most likely to graduate from, etc. Moreover, the knowledge varies over time. As a result, it is not surmising that even for experienced recruiters, it often requires many searching trials in order to obtain a satisfactory query. During these searching trials, the searcher may provide various refinements to previous queries, such as adding, removing, or altering search terms, or adding, removing, or altering search filters.

BRIEF DESCRIPTION OF THE DRAWINGS

Some embodiments of the technology are illustrated, by way of example and not limitation, in the figures of the accompanying drawings.

FIG. 14 is a screen capture illustrating a first screen of a user interface for performing an ideal candidate-based search in accordance with an example embodiment.

FIG. 15 is a screen capture illustrating a second screen of the user interface for performing an ideal candidate-based search, in accordance with an example embodiment.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a system is provided whereby refinements to a search query are automatically suggested to a searcher. More particularly, the system is able to make these "smart suggestions" based on multiple facets (e.g., title, company, industry, school, location, etc.) of the search results simultaneously.

In some example embodiments, the smart suggestions may be utilized in conjunction with a search query that was automatically generated based on a set of input "ideal" candidates. The query is then used to retrieve and/or rank results. In this manner, a searcher may list one or several examples of good candidates for a given position. For instance, hiring managers or recruiters can utilize profiles of existing members of the team for which the position pertains. In this new paradigm, instead of specifying a complex query capturing the position requirements, the searcher can simply pick up a small set of ideal candidates for the position. The system then builds a query automatically extracted from the input candidates and searches for result candidates based on this built query. It should be noted that the embodiments in which the smart suggestions are utilized in conjunction with a search query that was automatically generated based on a set of input "ideal" candidates are only examples, and nothing in this disclosure shall be interpreted as limiting the embodiments of the smart suggestions for use with such an ideal candidate search. Indeed, example embodiments are foreseen wherein the smart suggestions are utilized in conjunction with a text-based search or other types of searches.

It should be noted that the term "ideal", as used throughout the present disclosure, is not intended to be any sort of measurement of desirability of a candidate. Rather, a candidate is simply labeled as "ideal" if a searcher has specified the candidate as a basis for the search. In other words, if the searcher feels that the candidate is ideal enough to specify as a basis for the search, then that is enough for the candidate to be considered ideal for the systems and methods described herein. There is no necessity that that the candidate actually "be" ideal, nor any measurement of how ideal a candidate is.

Figure 1:
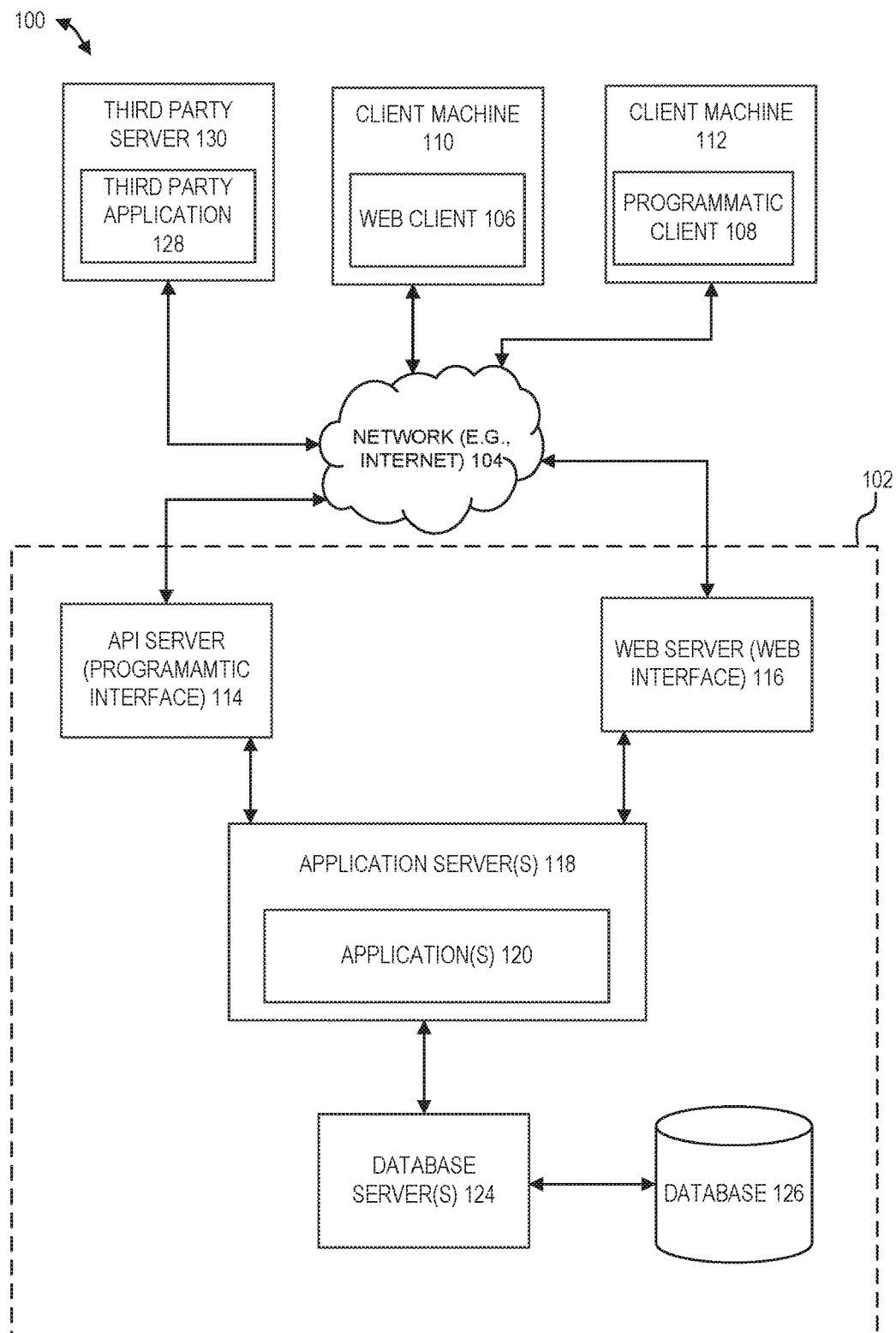
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
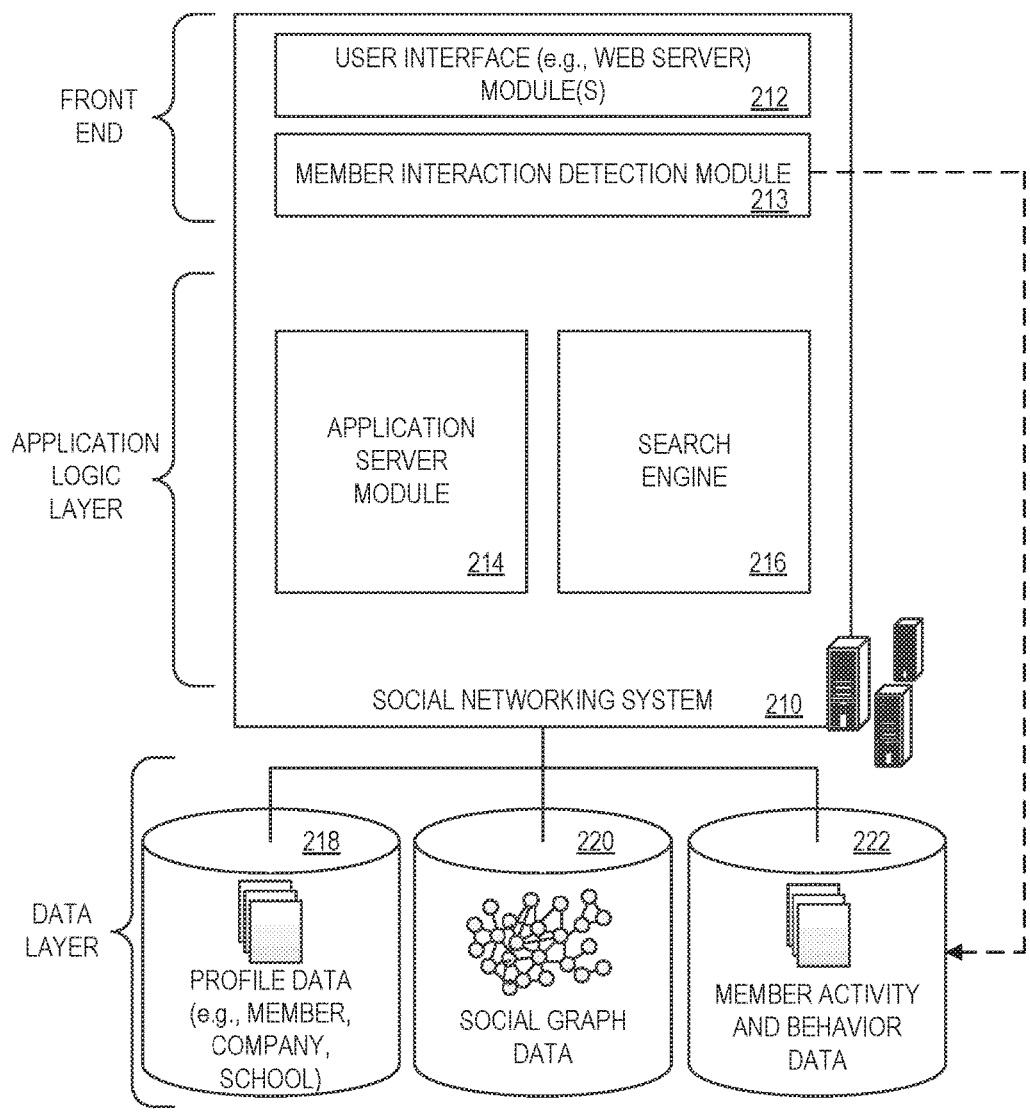
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases, the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
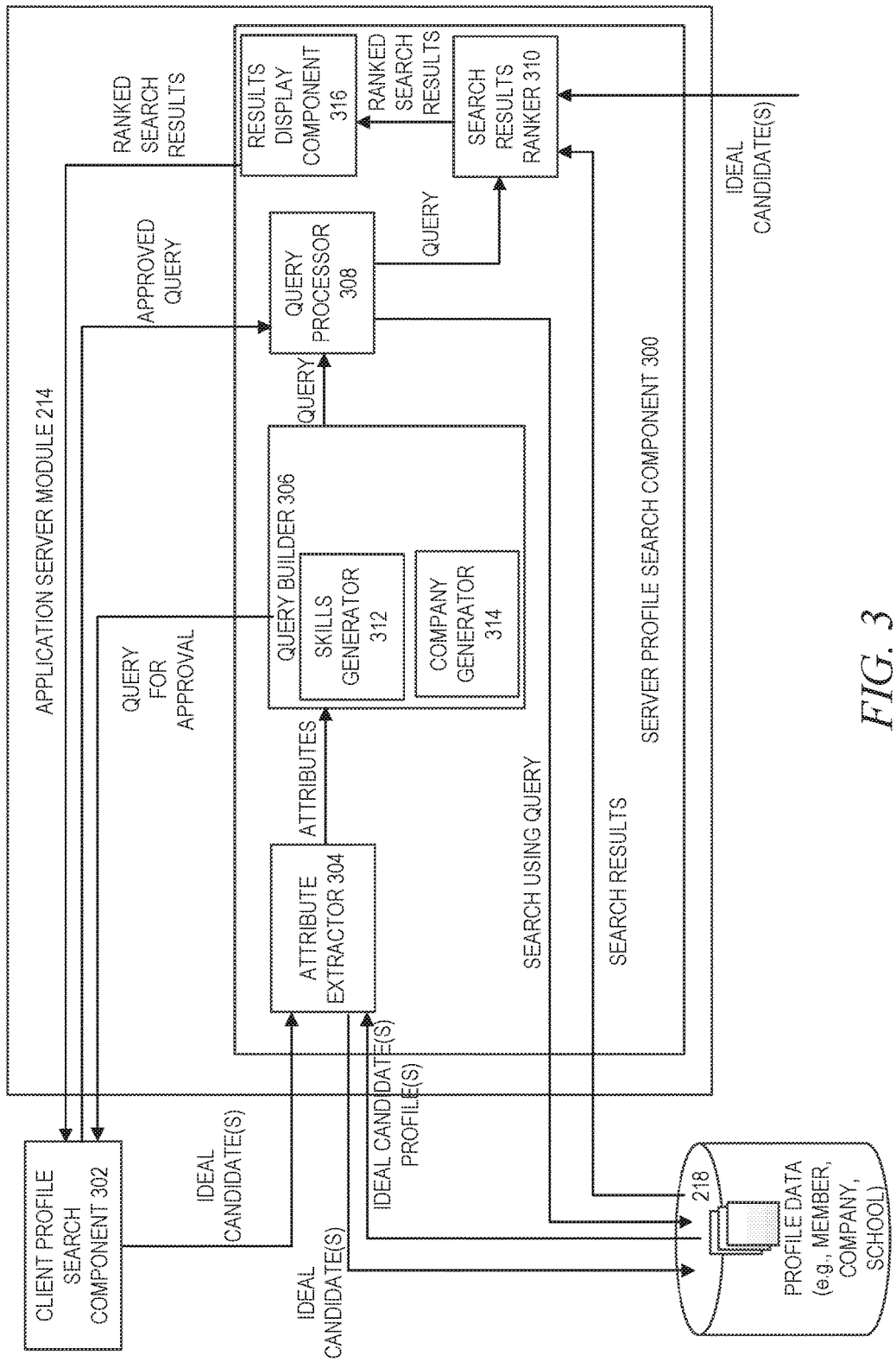
FIG. 3 is a block diagram illustrating an application server module of FIG. 2 in more detail, in accordance with an example embodiment.

FIG. 3 is a block diagram illustrating the application server module 214 of FIG. 2 in more detail. While in many embodiments the application server module 214 will contain many subcomponents used to perform various different actions within the social networking system 210, in FIG. 3 only those components that are relevant to the present disclosure are depicted. Here, a server profile search component 300 works in conjunction with a client profile search component 302 to perform one or more searches on member profiles stored in, for example, profile database 218. The server profile search component 300 may be, for example, part of a larger software service that provides various functionality to employers or recruiters. The client profile search component 302 may include a user interface and may be located on a client device. For example, the client profile search component 302 may be located on a searcher's mobile device or desktop/laptop computer. In some example embodiments, the client profile search component 302 may itself be, or may be a part of, a stand-alone software application 120 on the client device. In other example embodiments, the client profile search component 302 is a web page and/or web scripts that are executed inside a web browser on the client device. Regardless, the client profile search component 302 is designed to accept input from the searcher and to provide visual output to the searcher.

In an example embodiment, the input from the client profile search component 302 includes an identification of one or more ideal candidates for a job opening. This identification may be accomplished in many ways. In some example embodiments, the input may be an explicit identification of one or more member profiles stored in the profile database 218. This explicit identification may be determined by the searcher, for example, browsing or otherwise locating specific profiles that the searcher feels are ideal. For example, the searcher may know the identity of individuals on a team in which the open position is available, and may navigate to and select the profiles associated with those team individuals. In another example embodiment, the searcher may create one or more hypothetical "ideal candidate" profiles and use those as the input. In another example embodiment, the searcher may browse or search profiles in the profile database 218 using traditional browsing or searching techniques. In some example embodiments, the explicit identification may be provided by the job poster.

The server profile search component 300 may contain an attribute extractor 304. The attribute extractor 304 extracts raw attributes, including, for example, skills, companies, titles, schools, industries, etc., from the profiles of the one or more ideal candidates. These raw attributes are then passed to a query builder 306. For each attribute type, the query builder 306 aggregates the raw attributes across the input candidates, expands them to similar attributes, and finally selects the top attributes that best represent the ideal candidates.

After the query is generated, in an example embodiment, the generated query may be shown to the searcher via the client profile search component 302 and the searcher may have the opportunity to edit the generated query. This may include adding to or removing some attributes, such as skills and companies, in the query. As part of this operation, a query processor 308 may perform a search on the query and present raw results to the searcher via the client profile search component 302. These raw results may be useful to the searcher in determining how to edit the generated query.

In an example embodiment, a machine learning model is trained to make "smart suggestions" to the searcher as to how to modify the generated query. The model may be trained to output suggestions based on any number of different facets, such as title, company, industry, location, school, and skill.

Usage data can be gathered regarding actions taken by searchers when facing a suggestion—(1) add the suggestion, (2) delete the suggestion, or (3) ignore the suggestion. Intuitively, if a searcher adds a suggestion it is probably a desired one and thus can be considered a positive training sample. If the searcher deletes the suggestion it is probably not a desired one, and thus can be considered a negative training sample. For ignored suggestions, if the suggestion is positioned lower than an added suggestion (e.g. "Santa Clara University" is positioned lower than added "University of California, Santa Cruz"), then it is not certain whether the suggestion is really ignored by searchers or useless in the setting of the query. Thus, this data can be ignored. If, however, the ignored suggestion is positioned higher than an added suggestion, it can be treated as negative data.

In an example embodiment, various features may be analyzed to make a smart suggestion for one or more facets. A faceted classification system classifies each information element along multiple dimensions, called facets, enabling the classifications to be accessed and ordered in multiple ways rather than in a single, predetermined, taxonomic order. Facets correspond to properties of the information elements. They are often derived from analysis of an information element using entity extraction techniques or from pre-existing fields in a database 126.

The various features analyzed for each facet may include, for example, conditional entropy, entity affinity score, homophily score, region match, country match, and entity prior.

Referring to conditional entropy, as discussed earlier, the smart suggestions may be made based on cross-facet suggestions. Thus, signals from other facets may be utilized when suggesting possible values in one particular facet. Conditional entropy quantifies the amount of information needed to describe the outcome of one random variable given the value of another random variable.

In order to utilize conditional entropy in cross-facet suggestions, a distinction is made between an exclusive facet and an inclusive facet. For exclusive facets, such as title, the values exclude each other within the facet. As such, the system would not be suggesting alternative values within the facet but would be suggesting values in other facets (cross-facet suggestions). In an example embodiment, a min max framework is employed to measure the significance of adding a particular value in one of these other facets. Here, a maximum conditional entropy gain for each of these other facets is computed by adding each value in each of these other facets. Next, the minimum maximum gain over all of these other facets is computed.

Specifically:

$$signal = \min_{f_i} \{\max_{v_j \in f_i} CondEntropyGain(v, v_j)\}$$

Here, $f_i$ is the facet, $v_j$ is the particular value in facet $f_i$, CondEntropyGain($v, v_j$) is the gain for conditional entropy by adding the value $v_j$ into the facet. Conditional entropy may be defined as follows:

$$CondEntropyGain(v_i \mid v_j) = \left(1 - \frac{N(v_i \mid v_j)}{N(v_i) + N(v_j) - N(v_i, v_j)}\right) * \log(10, 10 + N(v_i) - N(v_i, v_j))$$

where $N(v_i)$, $N(v_j)$ and $N(v_i, v_j)$ are the number of members with value $v_i$, the number of members with value $v_j$ and the number of members with both $v_i$ and $v_j$, respectively. Thus, the conditional entropy calculation is based on the co-occurrence of values $v_i$ and $v_j$ in member profiles.

For inclusive facets, such as skills, the values are inclusive of others within the facet. Therefore, for cross facet conditional entropy, the min max framework used for exclusive facets can be used, but for within-facet conditional entropy, the minimum value gain across all values within the facet may be used.

Turning now to entity affinity score, the co-occurrence signal across different facets can be an important indicator when aiming for cross-facet suggestion. This co-occurrence between values from two facets may be termed the entity affinity score feature. For example, if "software engineer" is taken in a title facet and "San Francisco Bay area" is taken in a location facet as an example, first the co-occurrences between "software engineer" and "San Francisco Bay area" in member profiles are counted. Then the count is normalized by the maximum count of "software engineer" and "San Francisco Bay Area" as the feature value.

Specifically, given facet value Qi, the entity affinity between facet value Qi and potential facet value recommendation Rj can be measured as $$Sim(Q_i, R_j) = \int_{m_l} \int_{m_k} I(m_l, Q_i) I(m_k, R_j) Sim(Q_i, R_j \mid m_l, m_k) P(m_l, m_k)$$

$$\simeq \int_{m_l} \int_{m_k} I(m_l, A_i) I(m_k, R_j) Sim(m_k \to m_l) P(m_l) P(m_k)$$

Where I(ml, Qi) is the identity function defined as member ml having the specific attribute Qi.

Turning now to homophily score, this score takes into account the location of searchers in candidate discovery.

Thus, this score is an indicator of how close the searcher's location is to each possible search result's location.

Region match is an indicator as to whether a region specified in a current query matches regions of possible search result locations. Likewise, country match is an indicator as to whether the countries specified in a query match countries of possible search result locations.

Entity prior is a measure of usage of various candidate search results. Specifically, if a potential search result does not have a lot of prior hits from previous displays of the potential search result, there may be a bias towards not including facets related to that search result as smart suggestions.

Figure 4:
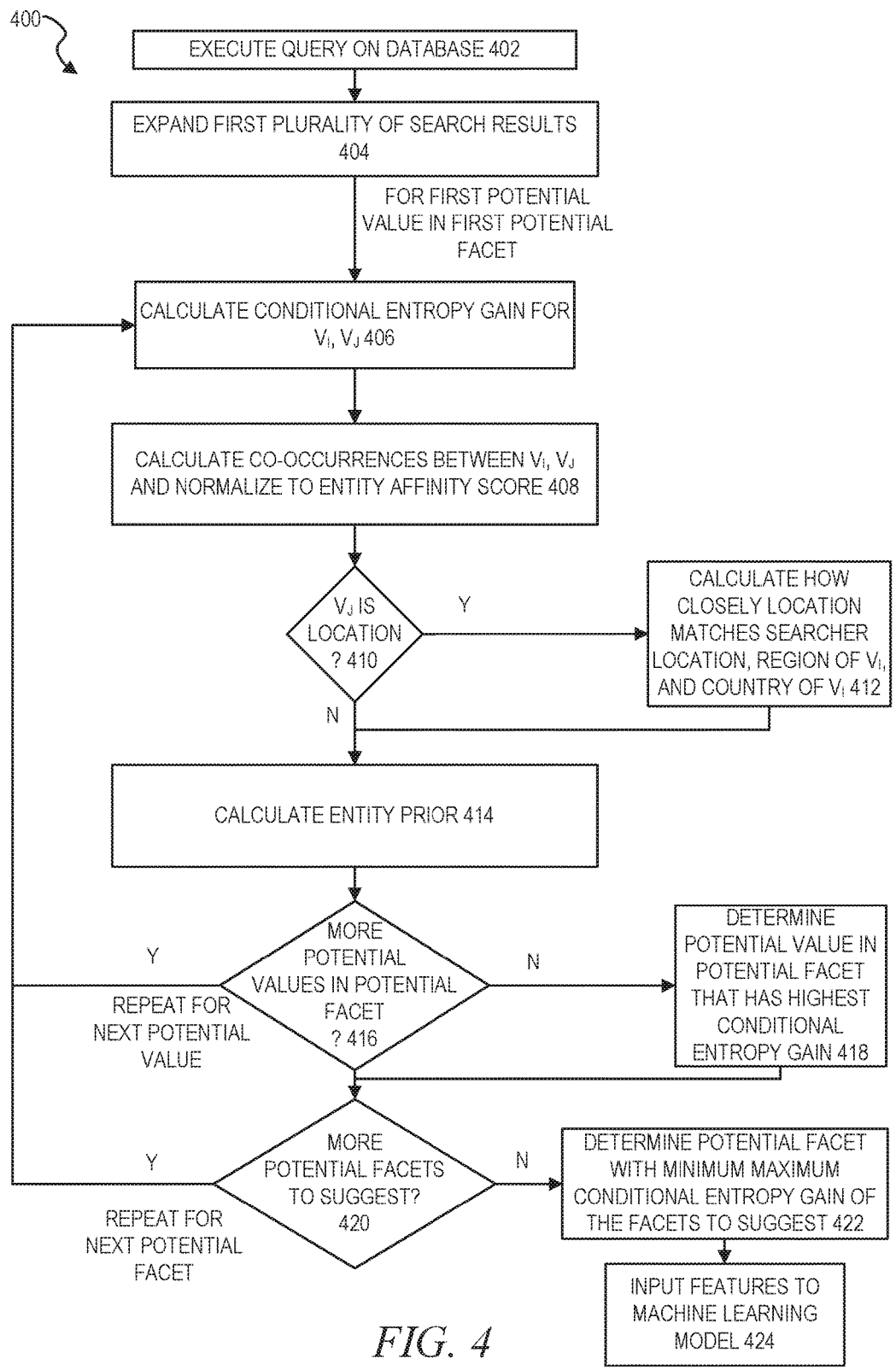
FIG. 4 is a flow diagram illustrating a method for automatic generation of smart suggestions of facets to add to a query, in accordance with an example embodiment.

FIG. 4 is a flow diagram illustrating a method 400 for automatic generation of smart suggestions of facets to add to a query, in accordance with an example embodiment. At operation 402, the query is executed on a database 126, producing a first plurality of search results. At operation 404, the first plurality of search results is expanded to include entries in the database 126 that are similar to the first plurality of search results. Similarity may be based on a number of different criteria. In one example embodiment, a result is similar if it shares at least some minimum number of threshold facet values with a search result in the first plurality of search results. For example, if the search results are candidate profiles, similar profiles may be identified by looking for profiles sharing at least 3 facet values with any candidate profile in the first plurality of search results.

Then a loop is begun to extract features from the query and from the expanded first plurality of search results. The loop cycles through each potential value ($v_j$) in each potential facet ($f_j$) that can be suggested based on each value ($v_i$) for each facet ($f_i$) in the query. Thus, the loop begins with a first potential value value ($v_j$) for a first potential facet ($f_j$) that can be suggested based on a first value ($v_i$) in a first facet ($f_i$) in the query. At operation 406, the conditional entropy gain for $v_i$, $v_j$ is calculated. This calculation was described in more detail earlier.

At operation 408, co-occurrences between $v_i$, $v_j$ are calculated and normalized to an entity affinity score. At operation 410, it is determined if the potential value $v_j$ is a location. If so, then at operation 412, it is calculated how closely this location matches searcher location (homophily score), a region of value $v_i$, and a country of value $v_i$.

At operation 414, entity prior is calculated based on whether potential results having potential value $v_j$ in potential facet $f_j$ have historically very few clicks.

At operation 416, it is determined if there are any more potential values in the potential facet. If so, then the method 400 loops back to operation 406 for the next potential value $v_j$ in potential facet $f_j$. If not, then at operation 418, the potential value $v_j$ in potential facet $f_j$ that has the highest conditional entropy gain is determined. At operation 420, it is determined if there are any more potential facets to suggest based on each value ($v_i$) for each facet ($f_i$) in the query. If so, then the method 400 loops back to operation 406 for the first potential value in the next potential facet. If not, then at operation 422, the potential facet with the minimum maximum conditional entropy gain of the facets to suggest based on each value ($v_i$) for each facet ($f_i$) in the query is determined.

At operation 424, the minimum maximum conditional entropy gain, and features calculated based on the entity affinity score, homophily score, matching region of value, matching country of value, and entity prior for each combination of $v_i$ are $v_j$ are used as input to a machine learning model trained to suggest a facet to add to the query based on this input.

It should be noted that, in some example embodiments, if multiple smart suggestions are to be suggested, a separate machine learning model may be used to determine the ranking of how these smart suggestions are to be presented to the searcher for possible inclusion in the query. The features used for this separate machine learning model may include, for example, some of the features for the machine learning model used to make the smart suggestions, but may include additional features either in lieu of or in addition to those previous features, including school affinity score, company affinity score, industry affinity score, title affinity score, geographical affinity score, skill affinity score, and similarity of industry type.

Referring back to FIG. 3, after the query is modified, the query processor 308 may refresh the search results. A search results ranker 310 may act to rank the search results, taking into account both the query (including potentially the generated query and the modified generated query) as well as the input ideal candidates when ranking the search results.

Referring back to the query builder 306, given the raw attributes from the profiles of the ideal candidates, the query builder 306 generates a query containing skills, companies, titles, etc. that best represents the ideal candidates.

The query builder 306 may comprise a skills generator 312 designed to generate skills to be added to the generated query. The social networking service may allow members to add skills to their profiles. Typical examples of skills that, for example, an information technology (IT) recruiter might search could be "search," "information retrieval," "machine learning," etc. Members may also endorse skills of other members in their network 104 by, for example asserting that the member does indeed have the specified skills. Thus, skills may be an important part of members' profiles that showcase their professional expertise. A technical challenge encountered, however, is that ideal candidates may not explicitly list all of the skills they have on their profiles. Additionally, some of their skills may not be relevant to their core expertise. For example, an IT professional may list "nonprofit fundraising" as a skill.

To overcome these challenges, expertise scores for the ideal candidate may be estimated based on explicit skills (skills the member has explicitly listed) as well as implicit skills (skills the member is likely to have, but has not explicitly linked).

Figure 5:
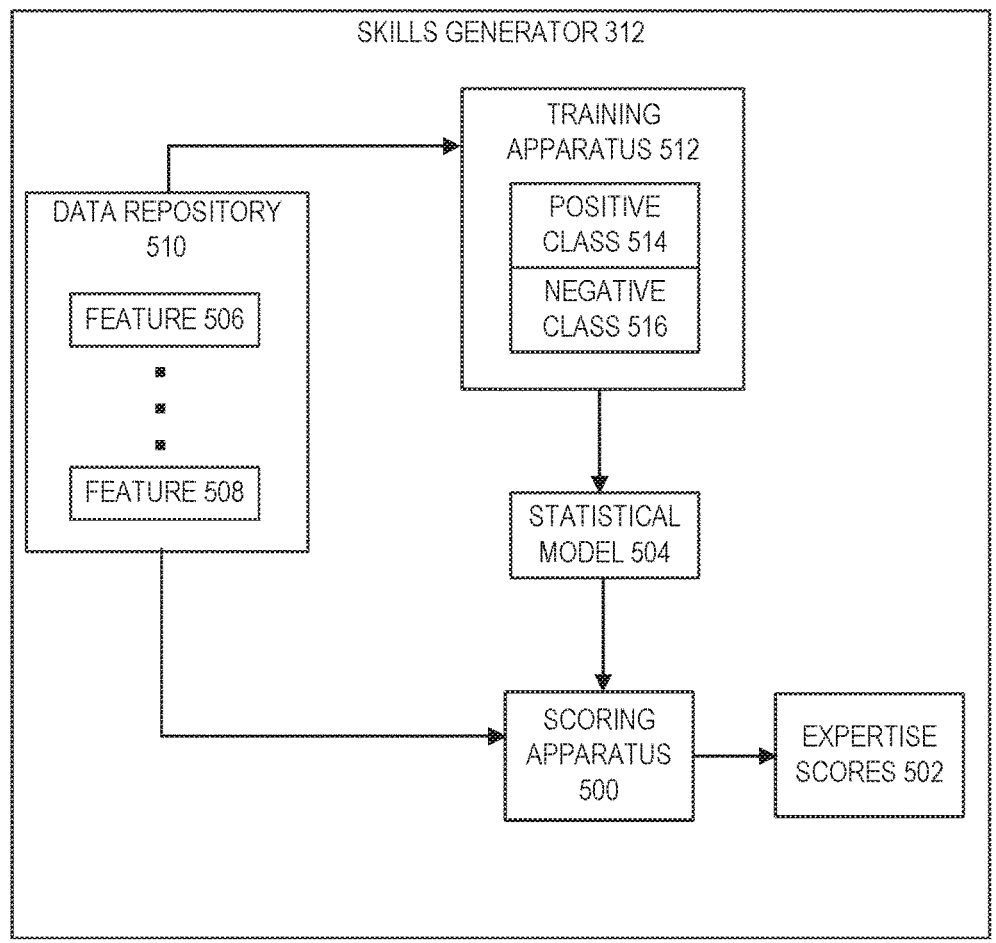
FIG. 5 is a block diagram illustrating a skills generator in more detail, in accordance with an example embodiment.

FIG. 5 is a block diagram illustrating the skills generator 312 in more detail, in accordance with an example embodiment. As shown in FIG. 5, a scoring apparatus 500 may calculate a set of expertise scores 502 using a statistical model 504 and a set of features 506-408 for candidate member profiles. Features 506-508 may be aggregated into a data repository 510 from the member profiles and/or user actions. For example, features 506-508 may be received from a number of servers and/or data centers associated with the websites and/or applications 120 and stored in a relational database 126 for subsequent retrieval and use.

Prior to calculating expertise scores 502 on actual member profiles, a training apparatus 512 may obtain training data for statistical model 504, which includes a positive class 514 and a negative class 516. Positive class 514 may include data associated with items of a particular category (e.g., trait, attribute, dimension, etc.), while negative class 516 may include data associated with items that do not belong in the category.

For example, statistical model 504 may be a logistic regression model that classifies each member profile as either an expert or a non-expert in a corresponding skill. Positive class 514 may thus include a subset of features 506-508 associated with members with known expertise in one or more skills. Such "expert" members may be identified based on publications, speeches, awards, and/or contributions of the users in their respective fields. On the other hand, negative class 516 may include a subset of features 506-508 associated with members who are not recognized as experts in their respective fields, such as random members who list a given skill in their profiles. Because far fewer users belong in positive class 514 than negative class 516, positive class 514 may be oversampled to produce a roughly class-balanced set of training data for statistical model 504.

Next, training apparatus 512 may use positive class 514 and negative class 516 to train statistical model 504. For example, training apparatus 512 may use maximum-likelihood estimation (MLE) and/or another estimation technique to estimate the parameters of a logistic regression model for calculating expertise scores 502. After training of the logistic regression model is complete, the parameters may be set so that the logistic regression model outputs values close to 1 for training data in positive class 514 and values close to 0 for training data in negative class 516.

The trained statistical model 504 may be provided to scoring apparatus 500, which calculates expertise scores 502 for member profiles not included in the training data (such as ideal member profiles supplied by the searcher) by applying statistical model 504 to features (e.g., features 506-508) for each of the items. For example, a feature vector may be generated for each item from a subset of features 506-508 in data repository 510, and statistical model 504 may be applied to the feature vector to calculate an expertise score for the item with respect to a dimension of the member profile.

Features 506-508 used in the calculation of expertise scores 502 may include demographic features, social features, and behavioral features. Demographic features may include data related to a user's location, age, experience, education, and/or background; social features may include features related to the behavior of other users with respect to the user; and behavioral features may include features related to the user's actions or behavior with the online professional network and/or related websites or applications 120.

Figure 6:
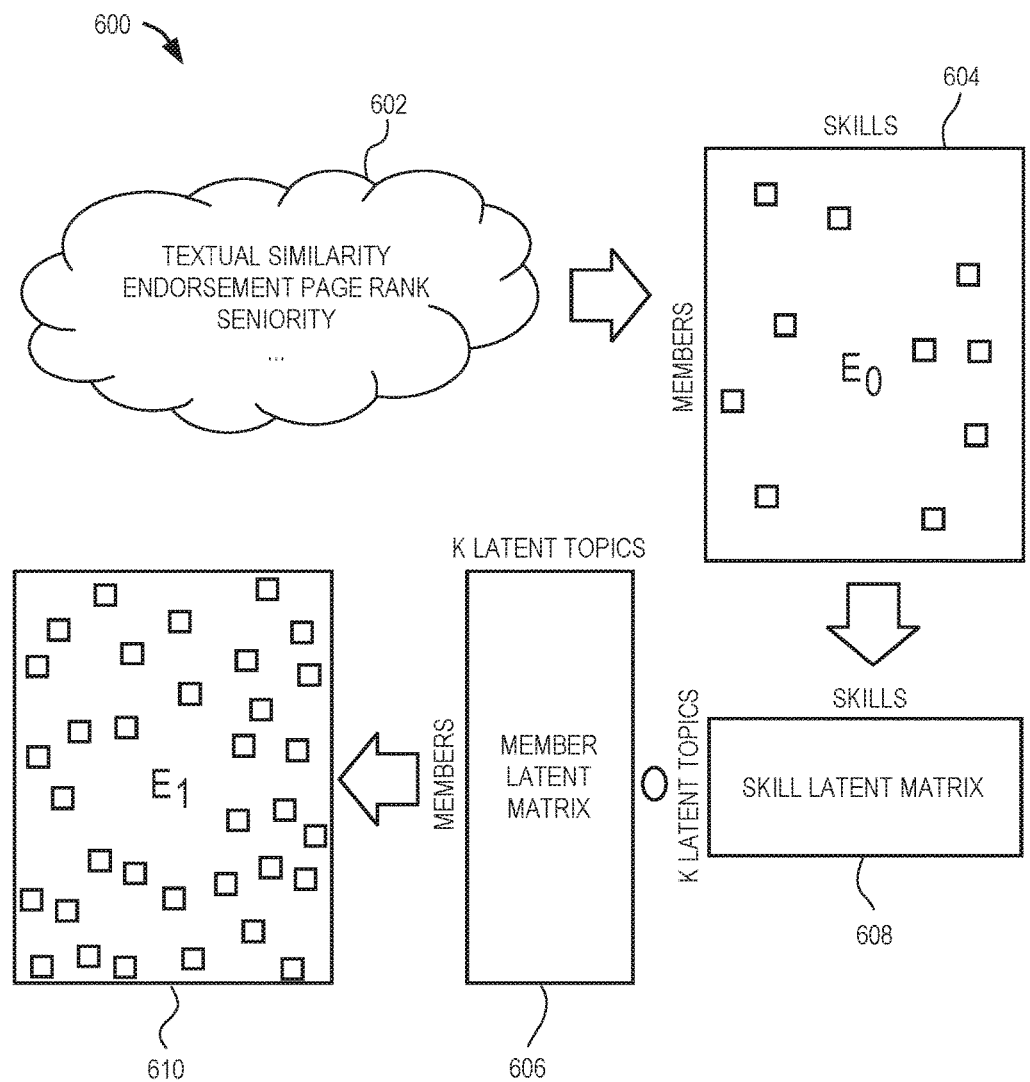
FIG. 6 is a diagram illustrating an offline process to estimate expertise scores, in accordance with another example embodiment.

FIG. 6 is a diagram illustrating an offline process 600 to estimate expertise scores 502, in accordance with another example embodiment. A supervised machine learning algorithm combines various signals 602, such as skill-endorsement graph page rank, skill-profile textual similarity, member seniority, etc. to estimate the expertise score. After this step, a formed expertise matrix 604 is very sparse since only a small percentage of the pairs can be predicted with any degree of certainty. Expertise matrix 604 may be factored into member matrix 606 and skill matrix 608 in K-dimensional latent space. Then, the dot-product of the expertise matrix 604 and skill matrix 608 is computed to fill in the "unknown" cells. The intuition is that the more members who list two particular skills in their corresponding member profiles (called co-occurrence of skills), the more likely it is that a member only listing one of those skills also has the other skill as a latent skill. Since the dot-product results in a large number of non-zero scores of each member on the skills, the scores can then be thresholded such that if the member's score on a skill is less than a particular threshold, the member is assumed not to know the skill and is assigned a zero expertise score on the skill. Thus, the final expertise matrix 610 is still sparse, but relatively much denser than formed expertise matrix 604.

Referring back to FIG. 3, at run time, given a set of input ideal candidates IC, the skills generator 312 ranks the skills for the group of ideal candidates using the formula:

$$f(\text{skill}) + \sum_{c \in IC} expertiseScore(c, \text{skill})$$

The top N skills are then selected to represent the ideal candidates. Expertise scores 502 of an ideal candidate on outlier skills are zero or very low, thus these skills are unlikely to be selected. Moreover, by taking the sum over all candidates, the skills which many candidates have are boosted, thus representing the commonality of the skill set among all ideal candidates.

Turning now to companies, given the ideal candidate profiles, beside their own companies, the query builder 306 can generate a set of companies which are likely to have candidates similar to the ideal candidates in the ideal candidate profiles. In order to accomplish this, the query builder 306 contains a company generator 314, which uses collaborative filtering to find company relationships. Specifically, a company browse map using co-viewing relationships (people who view company A and also view company B) may be utilized. Intuitively, companies co-viewed by highly overlapped sets of people are likely to be similar. Thus, activity and/or usage information for searchers/browsers within the social networking service may be retrieved and mined to construct the company browse map, and this browse map may then be used to find the company relationships by the company generator 314. Other information may be used either in conjunction with or in lieu of the company browse map. For example, the social networking service may keep track of candidates that apply to a given company. Therefore, it may deduce that if a user who applied to company B also applied to company A, then company A and company B are similar. This similarity relationship may be used like the browse map is used to generate companies related to companies identified in profiles of ideal candidates. Another signal that may be used is company movement, meaning that if a large number of people who left company A went to work for company B, this might imply that company A and company B are somewhat similar.

Similar strategies can be used for other facets of a query. For example, title, industry, locations, and schools can all be expanded from those facets in the idea candidate profiles by finding similar facets using, for example, browse maps.

Once the query builder 306 completes building the query based on the techniques described above, the query may be submitted to a search engine 216 to return search results. The hope, of course, is that the search results represent candidates who are similar in some ways to the ideal candidates submitted by the searcher, thus alleviating the searcher of the burden of composing the query. Once the results are returned, a search results ranker 310 may rank the search results according to one or more ranking algorithms. A subset of the top ranked search results may then be displayed to the searcher using a results display component 316. In an example embodiment, the results display component 316 interacts with the client profile search component 302 to facilitate such a display. The number of top ranked search results displayed may vary based on, for example, current size of a display window, font size, user preferences, etc.

While any ranking algorithms may be used by the search results ranker 310 to rank the search results, in an example embodiment, a machine learning algorithm is used to train a ranking model specifically to be used with searches generated by searchers providing ideal candidates in lieu of text-based keywords. Given the significant difference between a search by ideal candidates and a traditional query-based search, this algorithm helps provide rankings that accommodate this new type of search.

Figure 7:
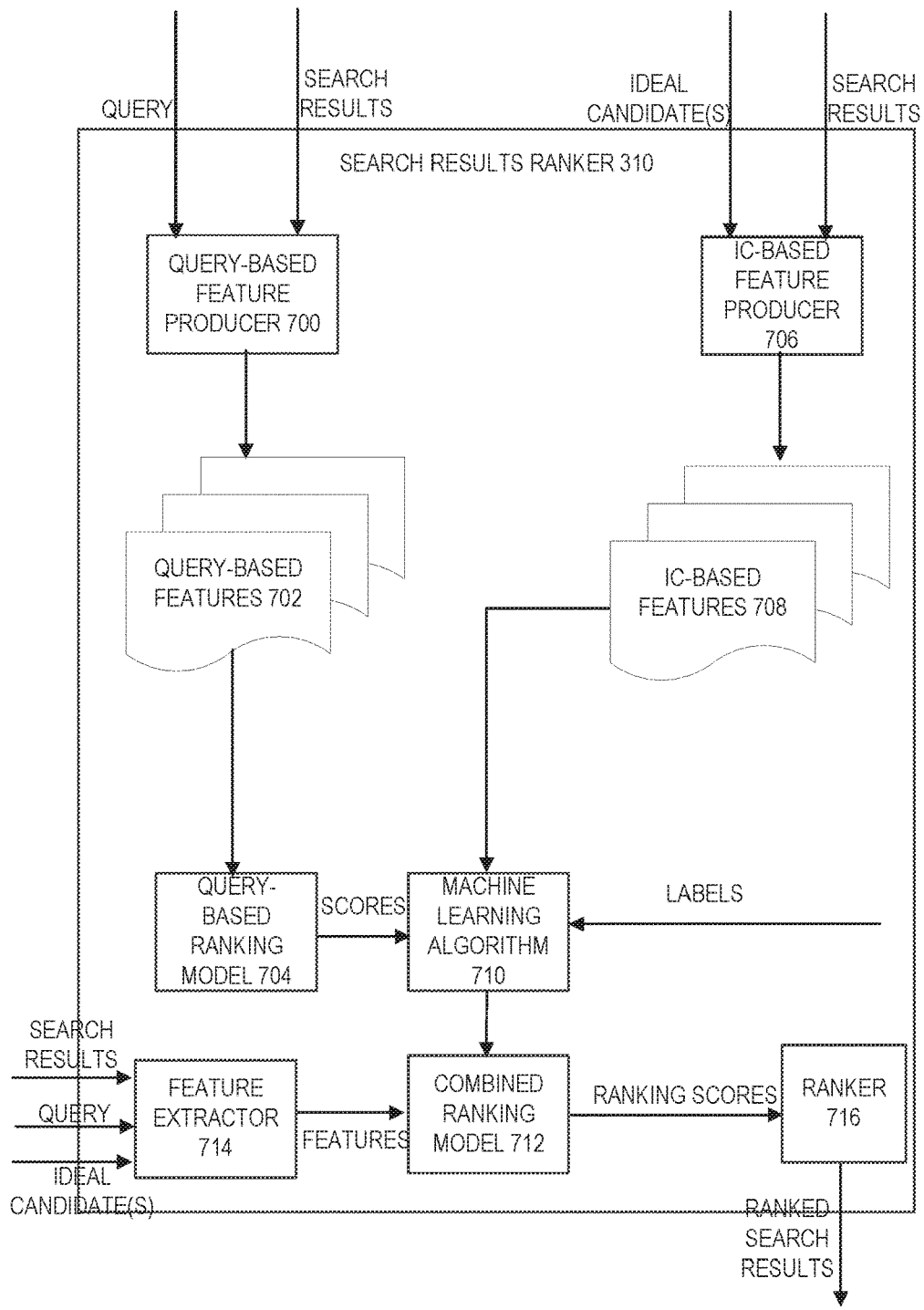
FIG. 7 is a block diagram illustrating a search results ranker in more detail, in accordance with an example embodiment.

FIG. 7 is a block diagram illustrating the search results ranker 310 in more detail, in accordance with an example embodiment. The search query that produced the search results, as well as the search results, may be fed to a query-based feature producer 700, which produces a set of query-based features 702 of the results. Query-based features 702 include search engine features such as term frequency-inverse document frequency (TF-IDF), term location in document, bag-of-words, etc. These query-based features 702 may be fed to a query-based ranking model 704, which returns scores for each of the query/result pairs.

Separately, an ideal candidate (IC)-based feature producer 706 receives as input the specified ideal candidate(s) and the search results from the query generated by the ideal candidate(s). The ideal candidate (IC)-based feature producer 706 then produces a set of ideal candidate-based features 708 of the results. Ideal candidate-based features 708 include features that are based on a comparison of ideal candidates and the search results (each feature measures one ideal candidate/search result pair). Example candidate-based features include similar career path, skill similarity, headline matching, headline similarity, and browse map similarity.

Similar career path is a measure of a trajectory similarity between the positions held by the ideal candidate and the search result. Thus, for example, if the ideal candidate started as an intern, was promoted to a staff engineer, and then was promoted to project manager, a search result having a similar progression of the trajectory of their career path would rank higher in this feature than, for example, a search result who started off at the top (e.g., as a project manager). To capture the trajectory information, each member profile may be modeled as a sequence of nodes, each of which records all information within a particular position of a member's career, such as company, title, industry, time duration, and keyword summary.

At the node (position) level, similarity can then be ascertained by using a generalized linear model, although in other embodiments other approaches could be substituted. Then, at the sequence (profile) level, a sequence alignment method may be employed to find an optimal or near-optimal alignment between pairs of nodes from the two career paths.

Various schemes may be used to model the node corresponding to a job position, including sequence of positions and sequence of compositions. In the sequence of positions scheme, each node represents one particular position of the member's professional experience. In the sequence of compositions scheme, for each node, in addition to using position information, transition information is also incorporated between the given position and the previous one. In other words, the position information, along with transition-related information, together comprise the node. Transition information, such as whether title changes in this transition, whether company changes, how the seniority changes, and the time in this transition, enhances the representation of this scheme by further disclosing information of the changing trend between a previous and a given position.

When evaluating the similarity between two career paths, each node is a representation of one particular work experience. In order to compute the overall similarity between two career sequences, the score may be decomposed into the sum of the similarity between several pairs of aligned nodes from the two sequences respectively. A sequence alignment algorithm may be used to measure the sequence level similarity by calculating the sum of the optimal alignment of node pairs. The two sequences may be aligned incrementally. The sequence alignment scheme can be formulated as a dynamic programming procedure.

Suppose there are two career sequences P1=[X1; X2; ;Xm] and P2=[Y1;Y2; ;Yn]. (Xi and Yj are position/composition nodes from two career sequences respectively.) Further, a step of aligning subsequences P1[1:i–1] and subsequence P2[1: j–1] may be encountered. (In other words, shorter subsequences have been aligned previously.) The subsequences P1[1:i] and P2[1:j] can be aligned in three ways according to the following cases:

(1) The node Xi is similar to node Yj. This leads to this pair of positions being aligned and results in an overall increase in sequence similarity score as contributed by this node similarity value. Here, P1[1:i] represents the subsequence X1, X2, . . . , Xi from career sequence P1.

(2) The node Xi is not very similar to node Yj. Thus, Xi will be skipped. Note that although a node is allowed to be skipped during sequence alignment, contiguous alignment may be desirable for the purpose of career path completeness. Therefore, a gap penalty may be imposed on sequence level similarity score when skipping a node.

(3) And vice versa: if the node Xi is not very similar to node Yj, the same gap penalty may be imposed.

It should be noted that the position-level similarity function employed may be symmetric. Hence, $S^{node}(X\_i, Y\_j)$ is the same as $S^{node}(Y\_j, X\_i)$. More formally, given the above two career sequences P1 and P2, the similarity between two career sequences can be solved using the following scheme:

$$S^{seq}(P_1[1: i], P_2[1: j]) = \max \begin{cases} S^{seq}(P_1[1: i-1], P_2[1: j-1]) + S^{node}(X_i, Y_j) \\ S^{seq}(P_1[1: i-1], P_2[1: j]) - \lambda \\ S^{seq}(P_1[1: i], P_2[1: j-1]) - \lambda \end{cases}$$

Therein, $S^{seq}$ is the similarity function at the career sequence level, $S^{node}$ is the similarity function at the position/composition node level, and $\lambda$ is the gap penalty parameter.

A similarity model may be learned at the node level by using, for example, a logistic regression model. Features relevant to this model may include, for example, current title, current company, current company size, current industry, current functions, job seniority, current position summary, title similarity, company similarity, industry similarity, duration difference between positions, whether two transitions were within the same company, whether two transitions were in the same industry, whether seniority changed, whether the title changed, and duration of time between the two transitions.

Skill similarity is a measure of similarity of the skill set of the ideal candidate and the skill set of the search result. It should be noted that skill sets may include skills that are explicit (e.g., specified by the member in their member profile) or implicit (e.g., skills that are similar to skills specified by the member in their member profile, but not explicitly listed).

Headline matching is a measure of the similarity between the query and the headline of each result. Notably, this is based on a text-based comparison, and is not strictly ideal candidate-based. A headline is one or more visible fields (along with name) displayed as a search result snippet for a search result. While the concept of creating snippets for each search result is a topic that is beyond the scope of the present disclosure, such snippets often include a headline that helps explain why the result is relevant and likely to trigger actions from the searcher. The headline matching feature, therefore, measures the similarity between the query and this headline from the search result's snippet.

Headline similarity is a measure of the similarity between a headline of the ideal candidate and the headline of the search result. This similarity calculation may be performed with or without considering word semantics. In example embodiments where word semantics are not considered, a word2vec algorithm may be utilized. Word2vec is a group of related models used to produce word-embeddings. The word-embeddings are shallow, two-layer neural networks that are trained to reconstruct linguistic contexts of words. The neural network is shown a word and guesses which words occurred in adjacent position in an input text. After training, word2vec models can be used to map each word to a vector of typically several hundred elements, which represent that word's relation to other words.

Browse map similarity is a measure of whether and how much other members/searchers/browsers visited both the ideal candidate's profile and the search result's profile in the same browsing session. The intuition is that if previous members/searchers/browsers viewed both profiles in the same session, then there is a higher likelihood that the profiles are similar, and thus that the underlying ideal candidate and search result are similar.

The ideal candidate-based features 708 may be fed along with the scores from the query-based ranking model 704 to a machine learning algorithm 710. The machine learning algorithm 710 is designed to train a combined ranking model 712 that is capable of determining a ranking score for a search result at runtime. This training may use labels supplied for training data (e.g., training ideal candidates and training search results along with labeled scores for each). The training may involve the machine learning algorithm 710 learning which features/scores are more or less relevant to the ranking scores, and appropriately weighting such features and scores for runtime computations. At runtime, a feature extractor 714 extracts both query-based and ideal candidate-based features from the query, search results, and ideal candidates and feeds these features to the combined ranking model 712, which produces the scores as per its model. A ranker 716 then uses these ranking scores to rank the search results for display to the searcher.

It should be noted that since searching by ideal candidates is a new concept, it is difficult to generate labeled data directly from a log of previous search systems, as would typically be done to generate labeled data. Instead, in an example embodiment, labeled data is generated from the log of a query-based search. One such log is a log of electronic communications performed after the search. For example, if a searcher sees 20 results to a query-based search for candidates, and sends email communications to 8 candidates from the 20 results, then it may be assumed that these 8 candidates are similar enough to be considered for the same job, and thus if a profile for one or more of those 8 candidates had been submitted for a search by ideal candidate, the other candidates could be considered likely top results. In an example embodiment, other actions taken with respect to previous search results may be logged and similarly used to determine ideal candidate matches. For example, while communication with a candidate may be considered as strongly indicative of a match for the underlying position (and thus a match with other candidates also emailed for the same position) and assigned a high relevance score, clicking on a candidate (without an email) may be considered to be a partial match and may be assigned a moderate relevance score, while skipped results might be considered a low relevance score. The relevance scores may be used as the labels for the sample data.

Thus, in an example embodiment, communications between searchers and members of the social network service are monitored and logged and these communications are used to derive a label score for each sample search result/ideal candidate pair (the sample search results may simply be the search results presented in response to previous queries). The label score may be generated using various combinations of the metrics described above. For example, if the same searcher communicated with both candidates A and B in response to the same search query, then candidate B is assigned a score of 5 (on a scale of 1 to 5, 5 being most relevant) for an ideal candidate A and candidate A is assigned a score of 5 for an ideal candidate B. Actions such as clicking on a candidate that indicate a moderate relevance may be assigned a score of 3 and no actions may be assigned a score of 1. Scores for various log entries can then be combined and averaged. The result is profile pairs that have been assigned a score of between 1 and 5 based on previous actions or inactions by previous searchers. These label scores may then be used as labels for hypothetical ideal candidate/search result pairs for those same member profiles.

In an example embodiment, a dynamic weight trainer is introduced into the architecture of FIG. 7 in order to dynamically alter the weights assigned to the IC-based features 708. Specifically, a search query need not be limited to a single query and then the search is complete. Often the searcher may interact with the original query and search result to provide additional refinements of the original search. This is true not only with traditional text-based searches but also can be true with ideal candidate-based searches as well. This may be accomplished by the searcher applying additional filters and or making text-based additions to the initial ideal candidate-based search to refine the results. The result is that the role of the ideal candidate-based features, which directly measure the similarity between the ideal candidate(s) and the search results, become less and less important as the search is refined.

At the same time, as the search session continues, the confidence of the remaining attributes e.g., query-based attributes) increases in usefulness.

Figure 8:
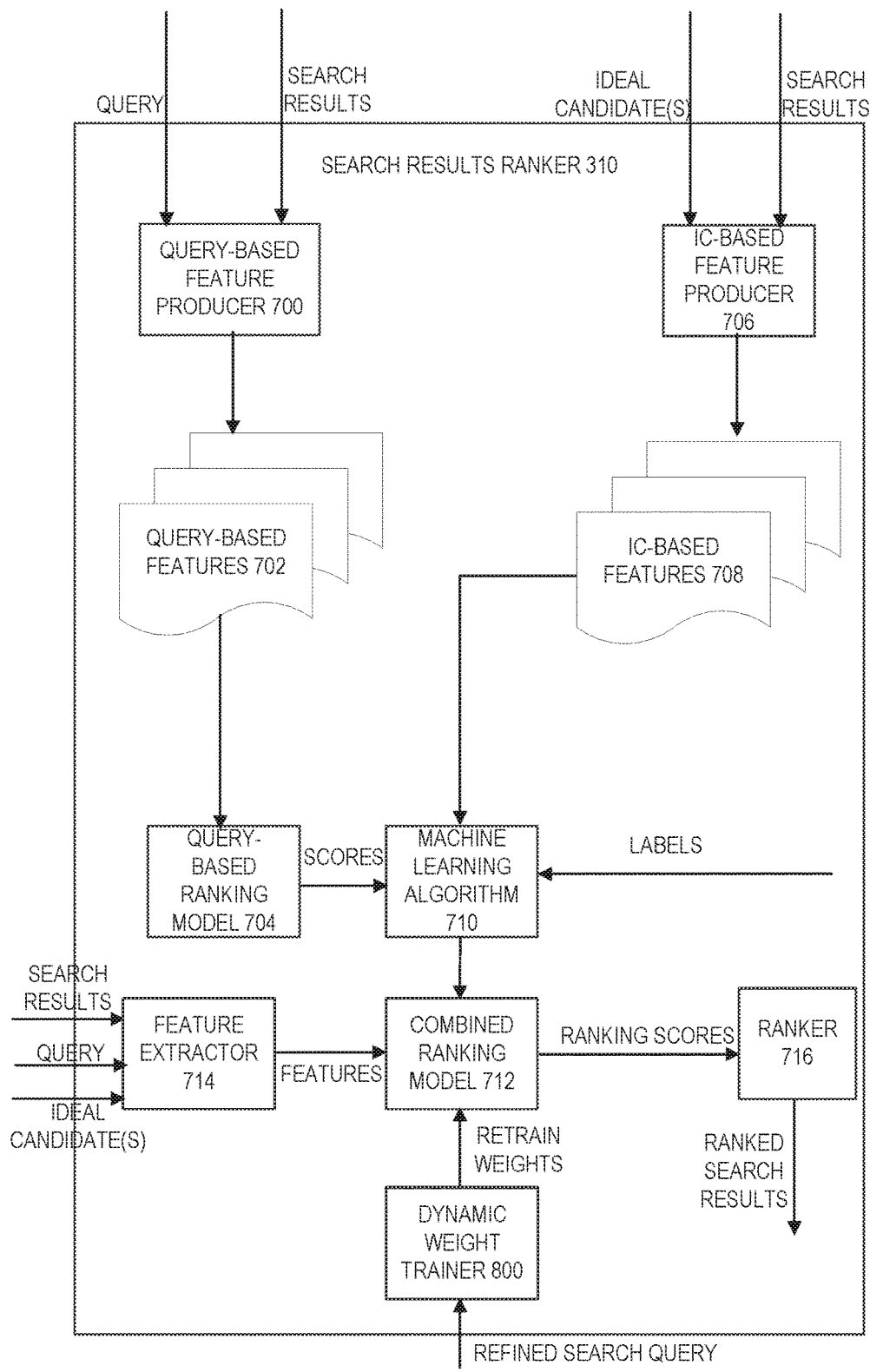
FIG. 8 is a block diagram illustrating a search results ranker in more detail, in accordance with another example embodiment.

FIG. 8 is a block diagram illustrating the search results ranker 310 in more detail, in accordance with another example embodiment. FIG. 8 is identical to FIG. 7 with the exception of the addition of a dynamic weight trainer 800. The purpose of the dynamic weight trainer 800 is to dynamically alter the weights of the features extracted to favor the query-based features 702 over the ideal candidate-based features 708 over time. This may be performed by applying a decay function, defined on some measure of session length, such as the number of query refinements, to gradually reduce the weights of the ideal candidate-based features 708 and/or increase the weights of the query-based features 702. This function controls the dynamic balance between the impacts of the ideal input candidates and the query on the result ranking.

Figure 9:
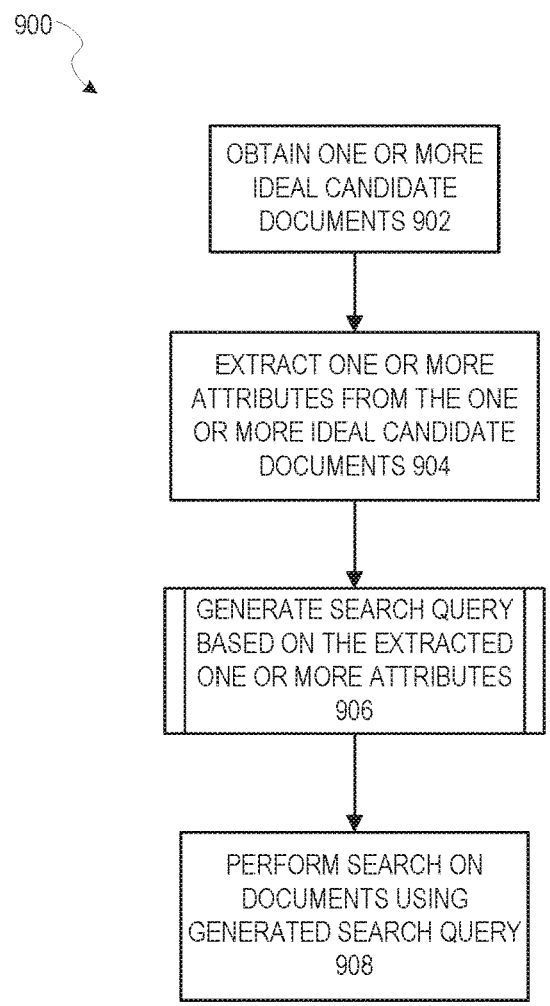
FIG. 9 is a flow diagram illustrating a method for performing an ideal candidate-based search, in accordance with an example embodiment.

FIG. 9 is a flow diagram illustrating a method 900 for performing an ideal candidate-based search, in accordance with an example embodiment. At operation 902, one or more ideal candidate documents may be obtained. In an example embodiment, these documents are member profiles in a social networking service and they are obtained by a searcher specifying the corresponding members and the member profiles being retrieved from a database 126 based on the searcher's specified members. However, implementations are possible where the documents obtained are not member profiles.

At operation 904, one or more attributes are extracted from the one or more ideal candidate documents. At operation 906, a search query is generated based on the extracted one or more attributes. At operation 908, a search is performed on documents using the generated search query, returning one or more result documents. Like with the ideal candidate documents, the result documents may also be member profiles in a social networking service.

Figure 10:
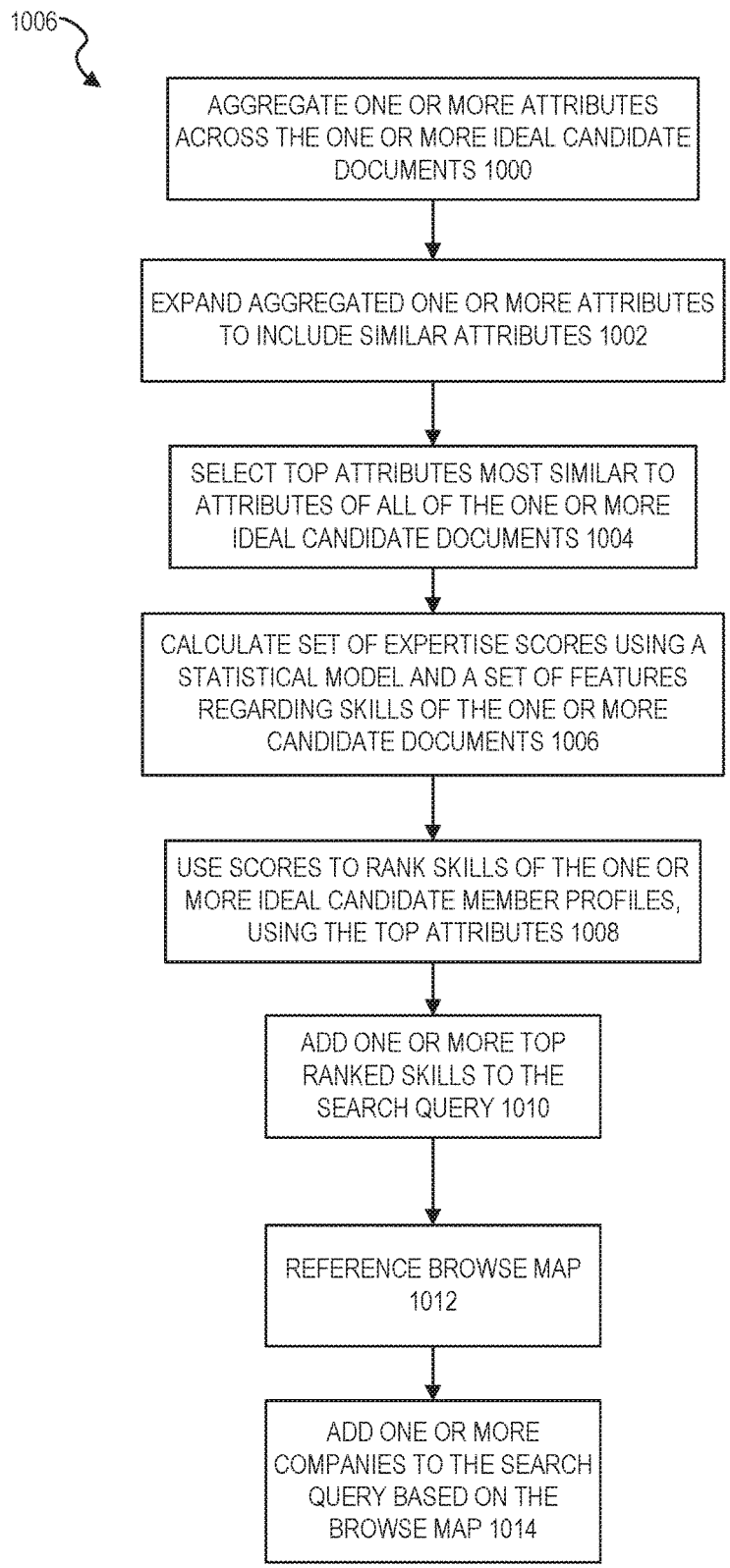
FIG. 10 is a flow diagram illustrating generating a search query based on extracted one or more attributes, in accordance with an example embodiment.

FIG. 10 is a flow diagram illustrating generating a search query based on extracted one or more attributes, in accordance with an example embodiment. FIG. 10 corresponds to operation 906 of FIG. 9 in more detail. At operation 1000, the one or more attributes are aggregated across the one or more ideal candidate documents. At operation 1002, the aggregated one or more attributes are expanded to include similar attributes. At operation 1004, top attributes most similar to attributes of all of the one or more ideal candidate documents are selected. At operation 1006, a set of expertise scores 502 are calculated using a statistical model 504 and a set of features regarding skills of the one or more candidate documents. The statistical model 504 may be a logistic regression model trained using a machine learning algorithm 710. At operation 1008 the expertise scores 502 are used to rank skills of the one or more ideal candidate member profiles, using the top attributes. At operation 1010, one or more top ranked skills are added to the search query.

At operation 1012, a browse map is referenced. At operation 1014, one or more companies are added to the search query, the companies being ones who have been co-viewed during the same browsing session as a company identified in one or more of the ideal candidate documents, by using the browse map.

Figure 11:
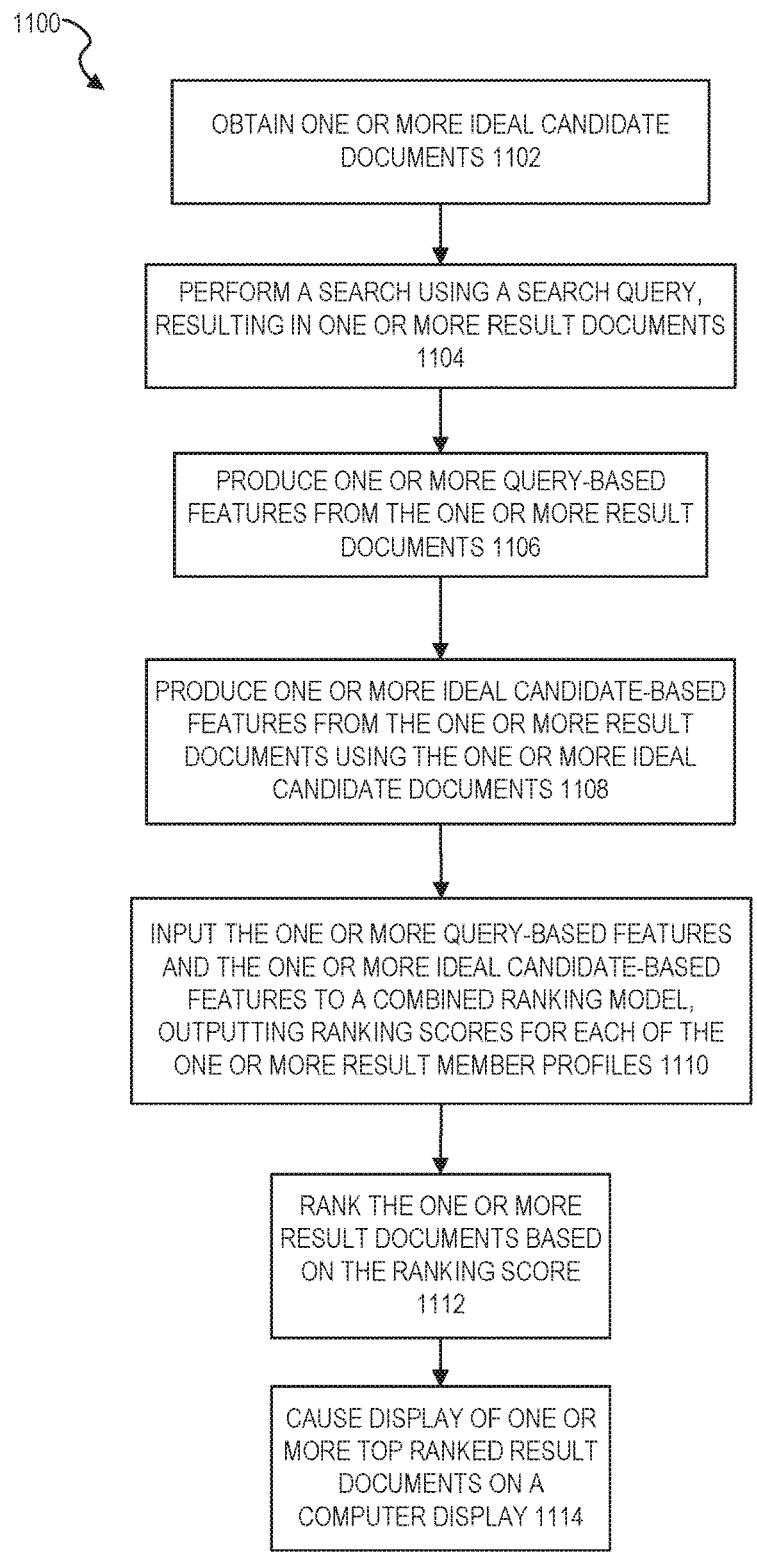
FIG. 11 is a flow diagram illustrating a method of ranking search results using ideal candidates, in accordance with an example embodiment.

FIG. 11 is a flow diagram illustrating a method 1100 of ranking search results using ideal candidates in accordance with an example embodiment. At operation 1102, one or more ideal candidate documents may be obtained. In an example embodiment, these documents are member profiles in a social networking service and they are obtained by a searcher specifying the corresponding members and the member profiles being retrieved from a database 126 based on the searcher's specified members. However, implementations are possible where the documents obtained are not member profiles.

At operation 1104, a search is performed using a search query, resulting one or more result documents. Like with the ideal candidate documents, the result documents may be member profiles in an example embodiment. In one example embodiment, operation 1104 can be performed using some of the operations described above with respect to FIGS. 9 and 10.

At operation 1106, one or more query-based features 702 are produced from the one or more result documents using the search query. As described above, this may include features such as TF-IDF.

At operation 1108, one or more ideal candidate-based features may be produced from the one or more result documents using the one or more ideal candidate documents. As described above, the ideal candidate-based features may include similar career path, skill similarity, headline matching, headline similarity, and/or browse map similarity.

At operation 1110, the one or more query-based features 702 and the one or more ideal candidate-based features are input to a combined ranking model 712, outputting ranking scores for each of the one or more result member profiles. The combined ranking model 712 may be trained using similar query-based and ideal candidate-based features from sample result documents as well as sample search queries and labels.

At operation 1112, the one or more result documents are ranked based on the ranking score. At operation 1114, display of the one or more top ranked result documents on a computer display is caused.

Figure 12:
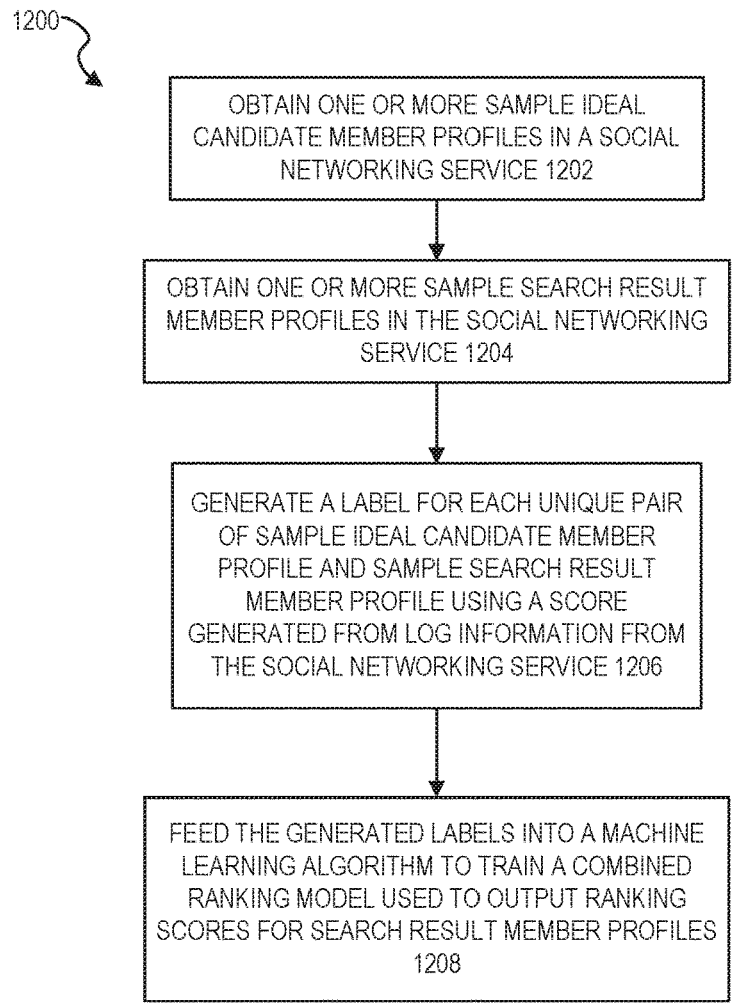
FIG. 12 is a flow diagram illustrating a method for generating labels for sample ideal candidate member profiles, in accordance with an example embodiment.

FIG. 12 is a flow diagram illustrating a method 1200 for generating labels for sample ideal candidate member profiles, in accordance with an example embodiment. At operation 1202, one or more sample ideal candidate member profiles in a social networking service are obtained. At operation 1204, one or more sample search result member profiles in the social networking service are obtained. At operation 1206, for each unique pair of sample ideal candidate member profile and sample search result member profile, a label is generated using a score generated from log information of the social networking service. The log information includes records of communications between a searcher and members of the social networking service, the score being higher if the searcher communicated with both the member corresponding to the sample ideal candidate member profile and the member corresponding to the sample search result member profile in a same search session. The log information may further include records of user input by the searcher, the user input causing interaction with member profiles in the social networking service but not resulting in communications between the searcher and the member of the social networking service corresponding to both the sample ideal candidate member profile and the sample search result member profile in the same search session. An example would include clicking on member profiles and viewing the member profiles but not emailing the corresponding members. A search session may be defined in a number of different ways. In one example embodiment, a search session is the same as a browsing session (e.g., as long as the searcher is logged in to the social networking service). In another example embodiment, the search session is limited to a period of time between a searcher initiating a search and the searcher submitting an unrelated search or logging off the social networking service.

At operation 1208, the generated labels are fed into a machine learning algorithm 710 to train a combined ranking model 712 used to output ranking scores for search result member profiles.

Figure 13:
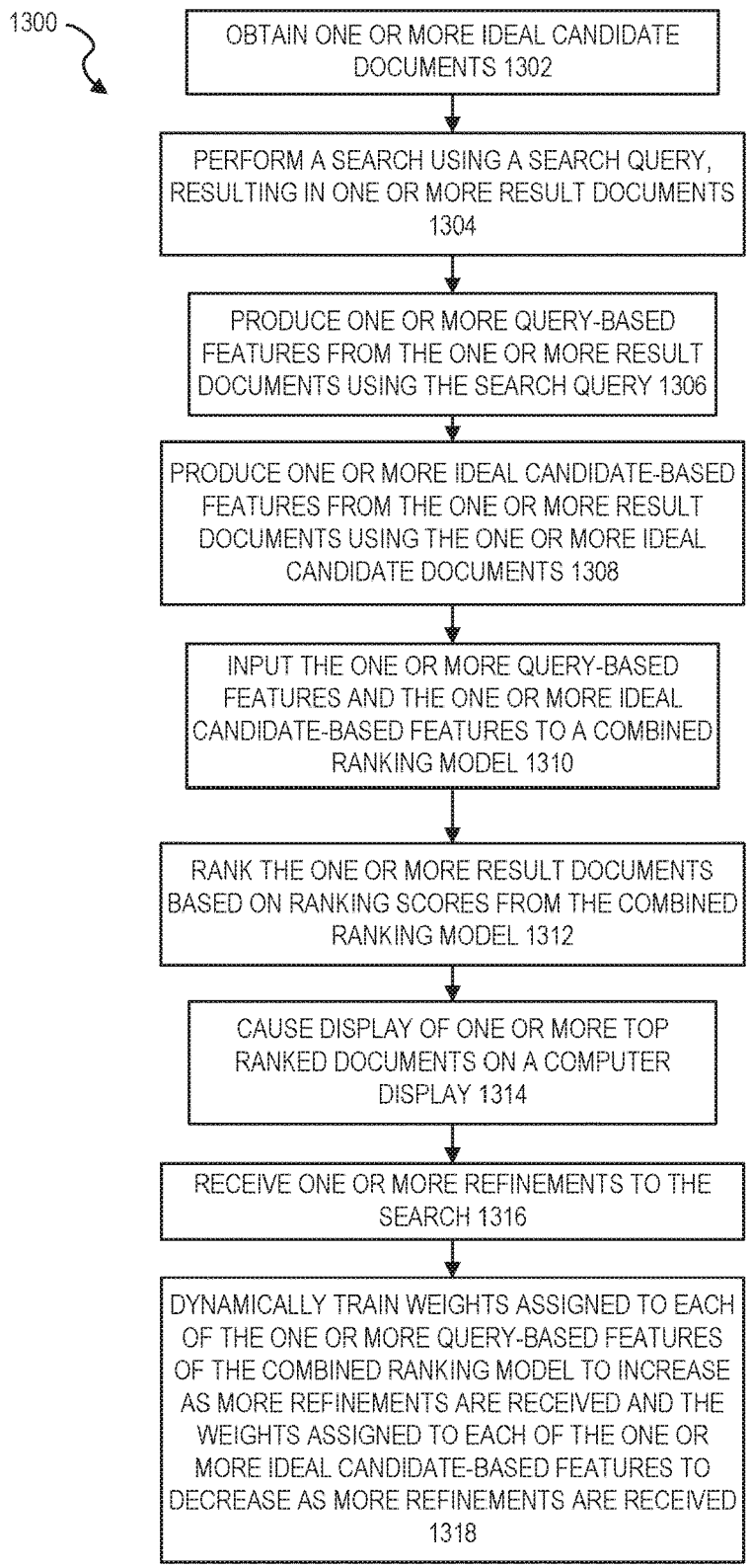
FIG. 13 is a flow diagram illustrating a method of dynamically training weights of a machine learning algorithm model, in accordance with an example embodiment.

FIG. 13 is a flow diagram illustrating a method 1300 of dynamically training weights of a machine learning algorithm model in accordance with an example embodiment. At operation 1302, one or more ideal candidate documents are obtained. At operation 1304, a search is performed using a search query, returning one or more result documents. This search query may or may not have been generated using the one or more ideal candidate documents.

At operation 1306, one or more query-based features 702 are produced from the one or more result documents using the search query. At operation 1308, one or more ideal candidate-based features are produced from the one or more result documents using the one or more ideal candidate documents. At operation 1310, the one or more query-based features 702 and the one or more ideal candidate-based features are input to a combined ranking model 712. The combined ranking model 712 is trained by a machine learning algorithm 710 to output a ranking score for each of the one or more result documents. The combined ranking model 712 includes weights assigned to each of the one or more query-based features 702 and each of the one or more ideal candidate-based features.

At operation 1312, the one or more result documents are ranked based on the ranking scores. At operation 1314, display of one or more top ranked documents on a computer display is caused. At operation 1316, one or more refinements to the search are received. At operation 1318, the weights assigned to each of the one or more query-based features 702 are dynamically trained to increase as more refinements are received, and the weights assigned to each of the one or more ideal candidate-based features are dynamically trained to decrease as more refinements are received. This dynamic training may utilize a decay function based on, for example, time or number of refinements.

Figure 14:
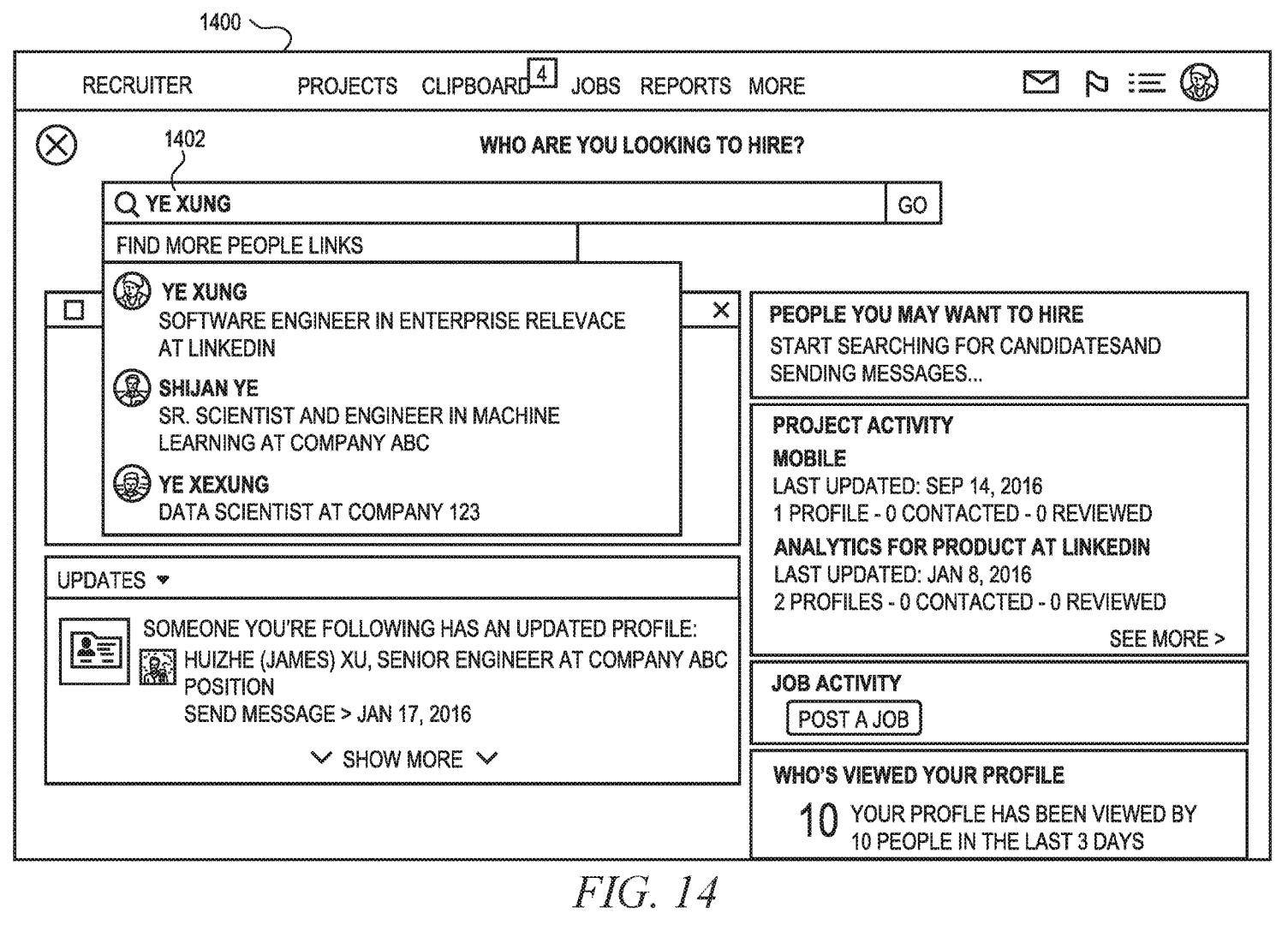

FIG. 14 is a screen capture illustrating a first screen 1400 of a user interface for performing an ideal candidate-based search, in accordance with an example embodiment. The first screen 1400 includes an area 1402 where a searcher can specify one or more ideal candidates for the search.

Figure 15:
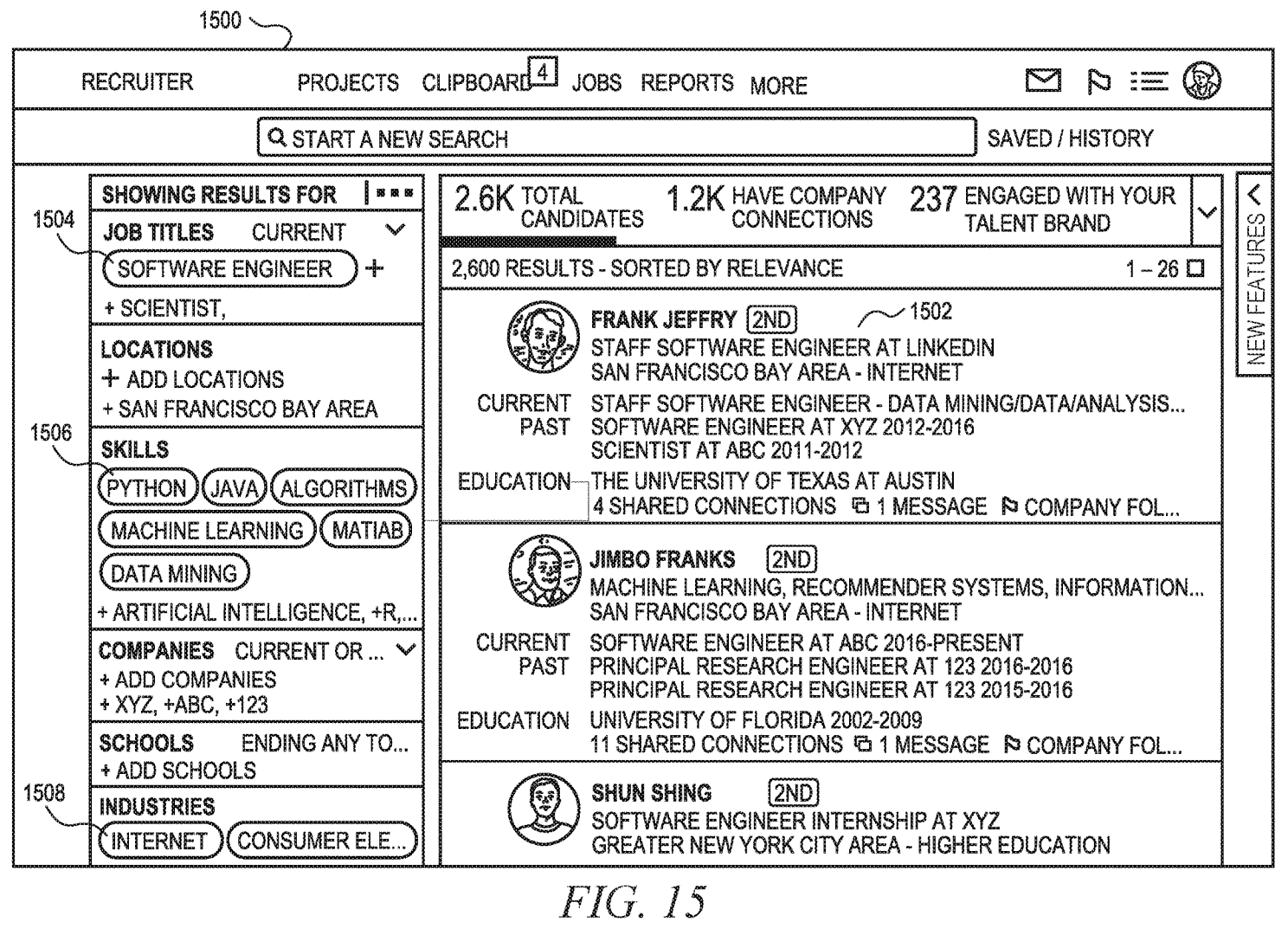

FIG. 15 is a screen capture illustrating a second screen 1500 of the user interface for performing an ideal candidate-based search in accordance with an example embodiment. The second screen 1500 presents results 1502 of the search, as well as displaying the query generated using the specified ideal candidates, the query used for the search. The query may be displayed by highlighting terms of the query in various categories. For example, "software engineer" 1504 is a job title that was generated for the query, "python" 1506 is a skill that was generated for the query, and "Internet" 1508 is an industry that was generated for the query. The searcher can then easily modify the query by adding additional terms to the query and/or removing some of the identified terms that had been previously generated.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application 120 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines 1700 (or specific components of a machine 1700) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications 120, and so forth described in conjunction with FIGS. 1-15 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 16:
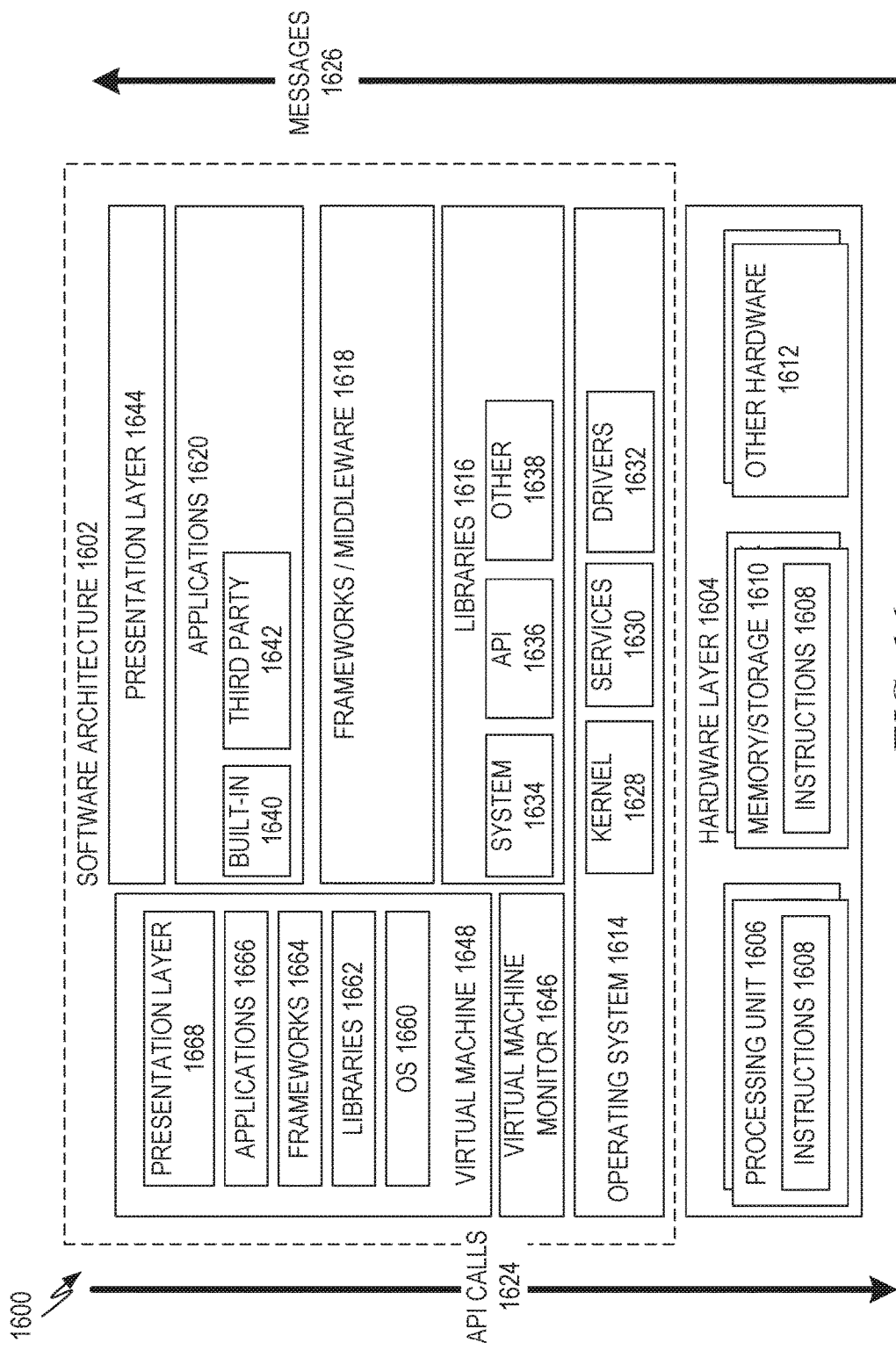
FIG. 16 is a block diagram illustrating a representative software architecture, which may be used in conjunction with various hardware architectures herein described.

FIG. 16 is a block diagram 1600 illustrating a representative software architecture 1602, which may be used in conjunction with various hardware architectures herein described. FIG. 16 is merely a non-limiting example of a software architecture, and it will be appreciated that many other architectures may be implemented to facilitate the functionality described herein. The software architecture 1602 may be executing on hardware such as a machine 1700 of FIG. 17 that includes, among other things, processors 1710, memory/storage 1730, and I/O components 1750. A representative hardware layer 1604 is illustrated and can represent, for example, the machine 1700 of FIG. 17. The representative hardware layer 1604 comprises one or more processing units 1606 having associated executable instructions 1608. The executable instructions 1608 represent the executable instructions of the software architecture 1602, including implementation of the methods, modules, and so forth of FIGS. 1-15. The hardware layer 1604 also includes memory and/or storage modules 1610, which also have the executable instructions 1608. The hardware layer 1604 may also comprise other hardware 1612, which represents any other hardware of the hardware layer 1604, such as the other hardware illustrated as part of the machine 1700.

In the example architecture of FIG. 16, the software architecture 1602 may be conceptualized as a stack of layers where each layer provides particular functionality. For example, the software architecture 1602 may include layers such as an operating system 1614, libraries 1616, frameworks/middleware 1618, applications 1620, and a presentation layer 1644. Operationally, the applications 1620 and/or other components within the layers may invoke API calls 1624 through the software stack and receive responses, returned values, and so forth, illustrated as messages 1626, in response to the API calls 1624. The layers illustrated are representative in nature and not all software architectures have all layers. For example, some mobile or special purpose operating systems 1614 may not provide a layer of frameworks/middleware 1618, while others may provide such a layer. Other software architectures may include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. The drivers 1632 may be responsible for controlling or interfacing with the underlying hardware. For instance, the drivers 1632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1620 and/or other components and/or layers. The libraries 1616 typically provide functionality that allows other software modules to perform tasks in an easier fashion than by interfacing directly with the underlying operating system 1614 functionality (e.g., kernel 1628, services 1630, and/or drivers 1632). The libraries 1616 may include system libraries 1634 (e.g., C standard library) that may provide functions such as memory allocation functions, string manipulation functions, mathematic functions, and the like. In addition, the libraries 1616 may include API libraries 1636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g. WebKit that may provide web browsing functionality), and the like. The libraries 1616 may also include a wide variety of other libraries 1638 to provide many other APIs to the applications 1620 and other software components/modules.

The frameworks 1618 (also sometimes referred to as middleware) may provide a higher-level common infrastructure that may be utilized by the applications 1620 and/or other software components/modules. For example, the frameworks 1618 may provide various graphic user interface (GUI) functions, high-level resource management, high-level location services, and so forth. The frameworks 1618 may provide a broad spectrum of other APIs that may be utilized by the applications 1620 and/or other software components/modules, some of which may be specific to a particular operating system 1614 or platform.

The applications 1620 include built-in applications 1640 and/or third party applications 1642. Examples of representative built-in applications 1640 may include, but are not limited to, a contacts application, a browser application, a book reader application, a location application, a media application, a messaging application, and/or a game application. The third party applications 1642 may include any of the built-in applications 1640 as well as a broad assortment of other applications. In a specific example, the third party application 1642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1642 may invoke the API calls 1624 provided by the mobile operating system such as the operating system 1614 to facilitate functionality described herein.

The applications 1620 may utilize built-in operating system 1614 functions (e.g., kernel 1628, services 1630, and/or drivers 1632), libraries 1616 (e.g., system libraries 1634, API libraries 1636, and other libraries 1638), and frameworks/middleware 1618 to create user interfaces to interact with users of the system. Alternatively, or additionally, in some systems, interactions with a user may occur through a presentation layer, such as the presentation layer 1644. In these systems, the application/module "logic" can be separated from the aspects of the application/module that interact with a user.

Some software architectures utilize virtual machines. In the example of FIG. 16, this is illustrated by a virtual machine 1648. A virtual machine 1648 creates a software environment where applications/modules can execute as if they were executing on a hardware machine (such as the machine 1700 of FIG. 17, for example). A virtual machine 1648 is hosted by a host operating system (e.g., operating system 1614 in FIG. 16) and typically, although not always, has a virtual machine monitor 1646, which manages the operation of the virtual machine 1648 as well as the interface with the host operating system (e.g., operating system 1614). A software architecture executes within the virtual machine 1648, such as an operating system 1660, libraries 1662, frameworks/middleware 1664, applications 1666, and/or a presentation layer 1668. These layers of software architecture executing within the virtual machine 1648 can be the same as corresponding layers previously described or may be different.

Example Machine Architecture and Machine-Readable Medium

Figure 17:
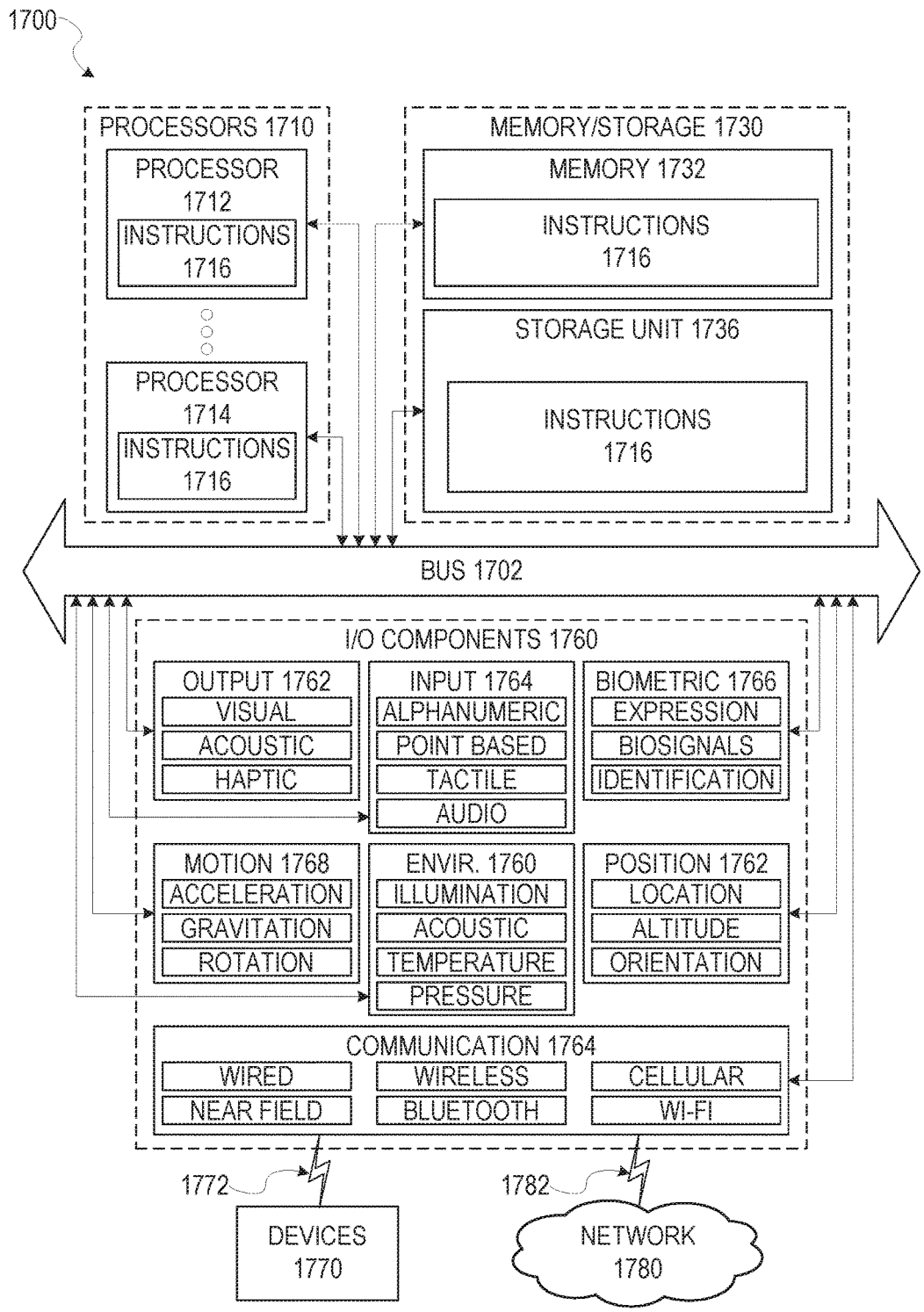
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions 1608 from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application 1620, an applet, an app, or other executable code) for causing the machine 1700 to perform any one or more of the methodologies discussed herein may be executed. The instructions 1716 transform the general, non-programmed machine 1700 into a particular machine programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory/storage 1730, and I/O components 1760, which may be configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1712 and a processor 1714 that may execute the instructions 1716. The term "processor" is intended to include multi-core processors 1710 that may comprise two or more independent processors 1710 (sometimes referred to as "cores") that may execute instructions 1716 contemporaneously. Although FIG. 17 shows multiple processors 1710, the machine 1700 may include a single processor 1712 with a single core, a single processor 1712 with multiple cores (e.g., a multi-core processor 1712), multiple processors 1710 with a single core, multiple processors 1710 with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of the processors 1710 are examples of machine-readable media.

As used herein, "machine-readable medium" means a device able to store instructions 1716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database 126, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1760 that are included in a particular machine 1700 will depend on the type of machine 1700. For example, portable machines such as mobile phones will likely include a touch input device or other such input mechanisms, while a headless server machine will likely not include such a touch input device. It will be appreciated that the I/O components 1760 may include many other components that are not shown in FIG. 17. The I/O components 1760 are grouped according to functionality merely for simplifying the following discussion and the grouping is in no way limiting. In various example embodiments, the I/O components 1760 may include output components 1762 and input components 1764. The output components 1762 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1764 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1760 may include biometric components 1766, motion components 1768, environmental components 1760, or position components 1762, among a wide array of other components. For example, the biometric components 1766 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1768 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1760 may include communication components 1764 operable to couple the machine 1700 to a network 1780 or devices 1770 via a coupling 1782 and a coupling 1772, respectively. For example, the communication components 1764 may include a network interface component or other suitable device to interface with the network 1780. In further examples, the communication components 1764 may include wired communication components, wireless communication components, cellular communication components, near field vommunication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a USB).

Moreover, the communication components 1764 may detect identifiers or include components operable to detect identifiers. For example, the communication components 1764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., HTTP). Similarly, the instructions 1716 may be transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
    receiving a query for search results, the query including at least one value for one facet, a facet defining a categorical dimension for the search results;
    determining that the facet in the query is exclusive;
    in response to the determination that the facet is exclusive:
        for each potential facet different from the facet in the query:
            for each potential value in the potential facet:
                determining conditional entropy gain of the value in the query and the potential value;
                determining the potential value in the potential facet that has the highest conditional entropy gain;
            determining the potential facet with the minimum maximum conditional entropy gain; and
            inputting the potential facet with the minimum maximum into a machine learning model, causing the machine learning model to output one or more suggested facets to add to the query.

2. The computerized method of claim 1, further comprising:
    for each potential value in each potential facet, determining that the potential value is a location and in response to the determining that the potential value is a location, determining how close the potential value is to a location of a searcher that created the query; and
    wherein the inputting includes inputting how close the potential value is to the location of the searcher into the machine learning model.

3. The computerized method of claim 1, further comprising:
    for each potential value in each potential facet, determining that the potential value is a location and in response to the determining that the potential value is a location, determining whether a region of the potential value matches a region of the value; and
    wherein the inputting includes inputting whether the region of the potential value matches the region of the value into the machine learning model.

4. The computerized method of claim 1, further comprising:
    for each potential value in each potential facet, determining that the potential value is a location and in response to the determining that the potential value is a location, determining whether a country of the potential value matches a country of the value; and
    wherein the inputting includes inputting whether the country of the potential value matches the country of the value into the machine learning model.

5. The computerized method of claim 1, wherein the search results are member profiles in a social networking service.

6. The computerized method of claim 5, wherein the query is a query specifying ideal candidate profiles.

7. The computerized method of claim 1, wherein the potential facet is always different than the facet when the facet is an exclusive facet.

8. A system comprising:
a computer-readable medium having instructions stored thereon, which; when executed by a processor, cause the system to:
receive a query for search results, the query including at least one value for one facet, a facet defining a categorical dimension for the search results;
determine that the facet in the query is exclusive;
in response to the determination that the facet is exclusive:
for each potential facet different from the facet in the query:
for each potential value in the potential facet:
determine conditional entropy gain of the value in the query and the potential value;
determine the potential value in the potential facet that has the highest conditional entropy gain;
determine the potential facet with the minimum maximum conditional entropy gain; and
input the potential facet with the minimum maximum into a machine learning model, causing the machine learning model to output one or more suggested facets to add to the query.

9. The system of claim 8, wherein the instructions further cause the system to:
for each potential value in each potential facet, determine that the potential value is a location and in response to the determining that the potential value is a location, determine how close the potential value is to a location of a searcher that created the query; and
wherein the inputting includes inputting how close the potential value is to the location of the searcher into the machine learning model.

10. The system of claim 8, wherein the instructions further cause the system to:
for each potential value in each potential facet, determine that the potential value is a location and in response to the determining that the potential value is a location, determine whether a region of the potential value matches a region of the value; and
wherein the inputting includes inputting whether the region of the potential value matches the region of the value into the machine learning model.

11. The system of claim 8, wherein the instructions further cause the system to:
for each potential value in each potential facet, determine that the potential value is a location and in response to the determining that the potential value is a location, determine whether a country of the potential value matches a country of the value; and
wherein the inputting includes inputting whether the country of the potential value matches the country of the value into the machine learning model.

12. The system of claim 8, wherein the search results are member profiles in a social networking service.

13. The system of claim 12, wherein the query is a query specifying ideal candidate profiles.

14. The system of claim 8, wherein the potential facet is always different than the facet if the facet is an exclusive facet.

15. A non-transitory machine-readable storage medium comprising instructions, which when implemented by one or more machines, cause the one or more machines to perform operations comprising:
receiving a query for search results, the query including at least one value for one facet, a facet defining a categorical dimension for the search results;
determining that the facet in the query is exclusive;
in response to the determination that the facet is exclusive:
for each potential facet different from the facet in the query:
for each potential value in the potential facet:
determining conditional entropy gain of the value in the query and the potential value;
determining the potential value in the potential facet that has the highest conditional entropy gain;
determining the potential facet with the minimum maximum conditional entropy gain; and
inputting the potential facet with the minimum maximum into a machine learning model, causing the machine learning model to output one or more suggested facets to add to the query.

16. The non-transitory machine-readable storage medium of claim 15, further comprising:
for each potential value in each potential facet, determining that the potential value is a location and in response to the determining that the potential value is a location, determining how close the potential value is to a location of a searcher that created the query; and
wherein the inputting includes inputting how close the potential value is to the location of the searcher into the machine learning model.

17. The non-transitory machine-readable storage medium of claim 15, further comprising:
for each potential value in each potential facet, determining that the potential value is a location and in response to the determining that the potential value is a location, determining whether a region of the potential value matches a region of the value; and
wherein the inputting includes inputting whether the region of the potential value matches the region of the value into the machine learning model.

18. The non-transitory machine-readable storage medium of claim 15, further comprising:
for each potential value in each potential facet, determining that the potential value is a location and in response to the determining that the potential value is a location, determining whether a country of the potential value matches a country of the value; and
wherein the inputting includes inputting whether the country of the potential value matches the country of the value into the machine learning model.

19. The non-transitory machine-readable storage medium of claim 15, wherein the search results are member profiles in a social networking service.

20. The non-transitory machine-readable storage medium of claim 19, wherein the query is a query specifying ideal candidate profiles.

* * * * *